(12) United States Patent
Gupta et al.

(10) Patent No.: US 11,321,089 B2
(45) Date of Patent: May 3, 2022

(54) INSTRUCTION SET ARCHITECTURE BASED AND AUTOMATIC LOAD TRACKING FOR OPPORTUNISTIC RE-STEER OF DATA-DEPENDENT FLAKY BRANCHES

(71) Applicant: Intel Corporation, Santa Clara, CA (US)

(72) Inventors: Saurabh Gupta, Bengaluru (IN); Niranjan Soundararajan, Bengaluru (IN); Ragavendra Natarajan, Mysore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/914,338

(22) Filed: Jun. 27, 2020

(65) Prior Publication Data
US 2021/0326139 A1 Oct. 21, 2021

(30) Foreign Application Priority Data
Apr. 20, 2020 (IN) .............................. 202041016867

(51) Int. Cl.
*G06F 9/30* (2018.01)
*G06F 9/38* (2018.01)

(52) U.S. Cl.
CPC ...... *G06F 9/30058* (2013.01); *G06F 9/30043* (2013.01); *G06F 9/30145* (2013.01); *G06F 9/3867* (2013.01); *G06F 9/3857* (2013.01)

(58) Field of Classification Search
CPC .. G06F 9/3857; G06F 9/3867; G06F 9/30048; G06F 9/30058
See application file for complete search history.

(56) References Cited

U.S. PATENT DOCUMENTS 10,430,198 B2 10/2019 Gupta et al.
2002/0078331 A1* 6/2002 Ju ............................ G06F 9/383
712/240

(Continued)

OTHER PUBLICATIONS

Farooq et al., Store-Load-Branch (SLB) Predictor: A Compiler Assisted Branch Prediction for Data Dependent Branches, IEEE 19th International Symposium on High Performance Computer Architecture, 2013, 12 pages.

(Continued)

*Primary Examiner* — Zachary K Huson
(74) *Attorney, Agent, or Firm* — Nicholson De Vos Webster & Elliott LLP

(57) ABSTRACT

Methods and apparatuses relating to instruction set architecture (ISA) based and automatic load tracking hardware for opportunistic re-steer of data-dependent flaky branches are described. In one embodiment, a processor includes a pipeline circuit comprising a decoder to decode instructions into decoded instructions and an execution circuit to execute the decoded instructions, a branch predictor circuit to generate a predicted path for a branch instruction, and a branch re-steer circuit to, for the branch instruction dependent on a result from a load instruction, check if an instruction received by the pipeline circuit is the load instruction, and when the instruction received by the pipeline circuit is the load instruction, check for a write back of the result from the load instruction between a decode of the branch instruction with the decoder and an execution of the branch instruction with the execution circuit, and when the predicted path differs from a path based on the result from the load instruction, re-steer the branch instruction in the pipeline circuit to the path and cause execution of the branch instruction for the path based on the result from the load instruction.

24 Claims, 23 Drawing Sheets

(56) References Cited

U.S. PATENT DOCUMENTS

2012/0311308 A1* 12/2012 Xekalakis ........... G06F 9/30145
                                                                  712/239
2017/0147346 A1* 5/2017 Hornung ............... G06F 9/3806
2018/0173534 A1* 6/2018 Peled .................. G06F 9/30076

OTHER PUBLICATIONS

Sheikh et al., "Control-Flow Decoupling", 45th Annual IEEE/ACM International Symposium on Microarchitecture, 2012, 12 pages.

* cited by examiner

LOAD DEPENDENT BRANCH TABLE ENTRY FORMAT 300

| BRANCH IP 302 | # MISPREDICTIONS 304 | CONFIDENCE SCORE 306 | LOAD IP, CMP. INFO. 308 | LVT INDEX 310 |

FIG. 3

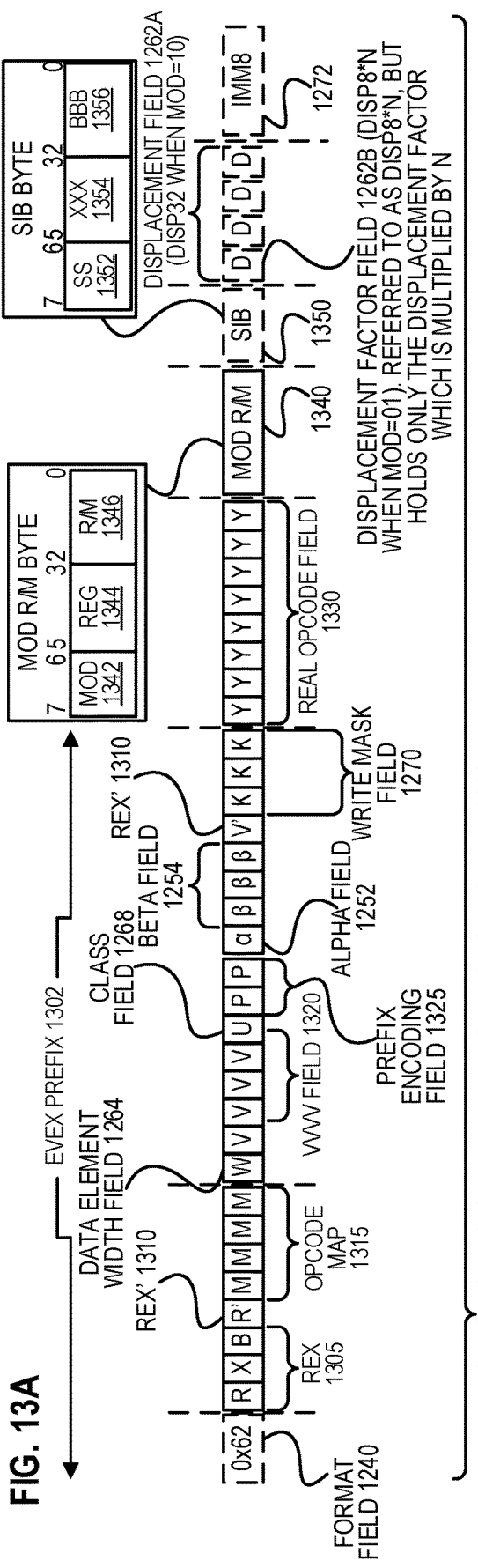
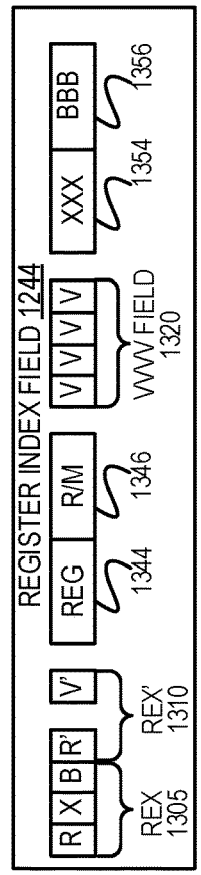
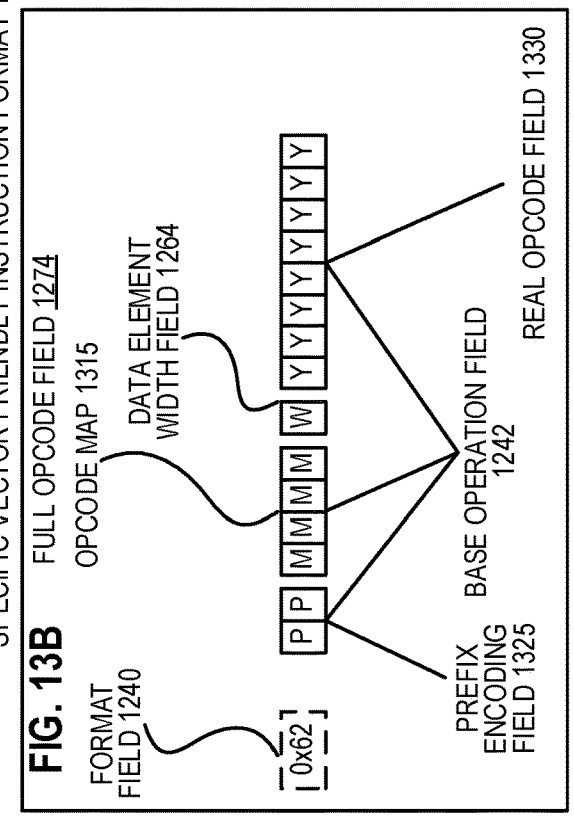

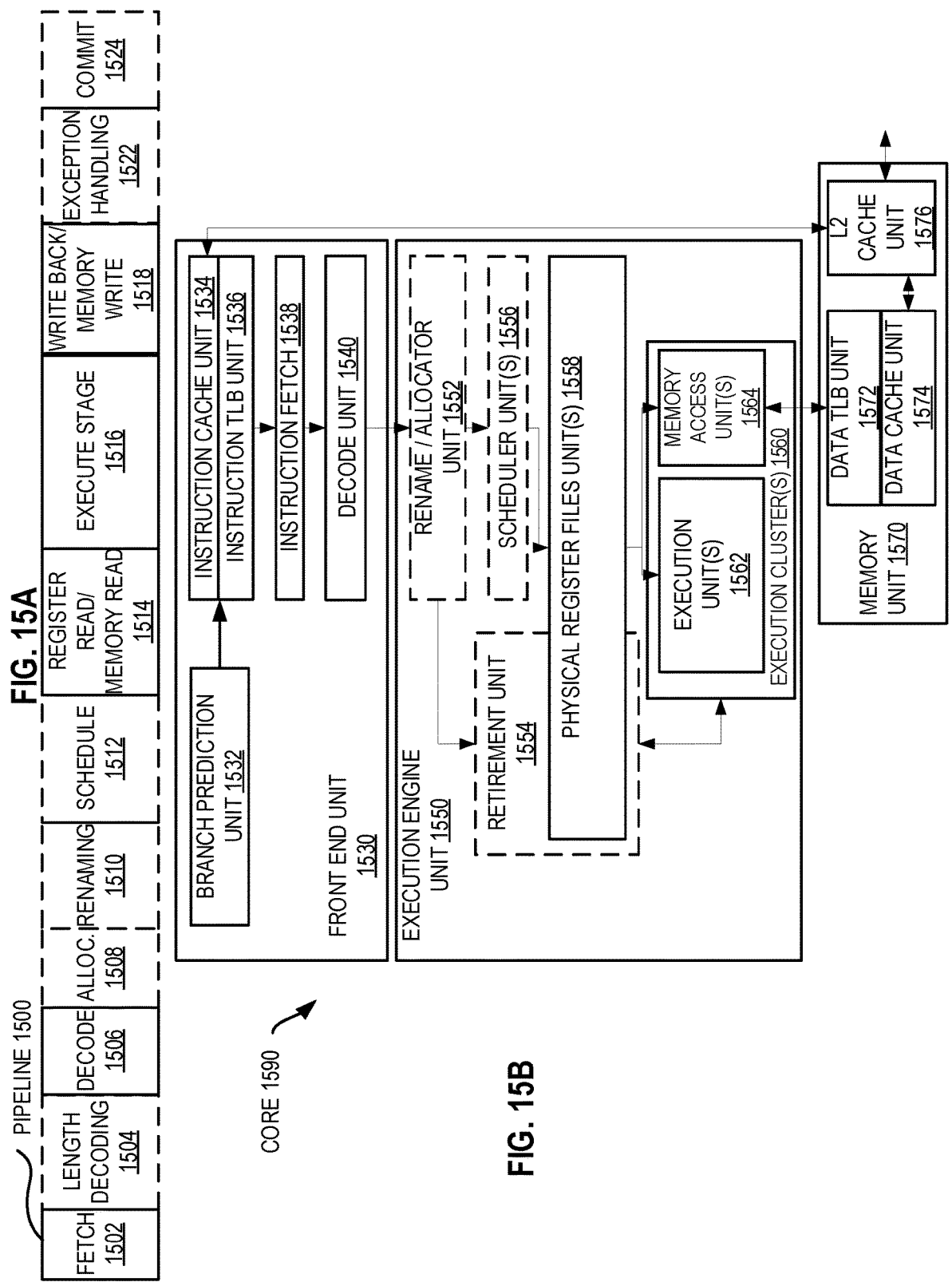

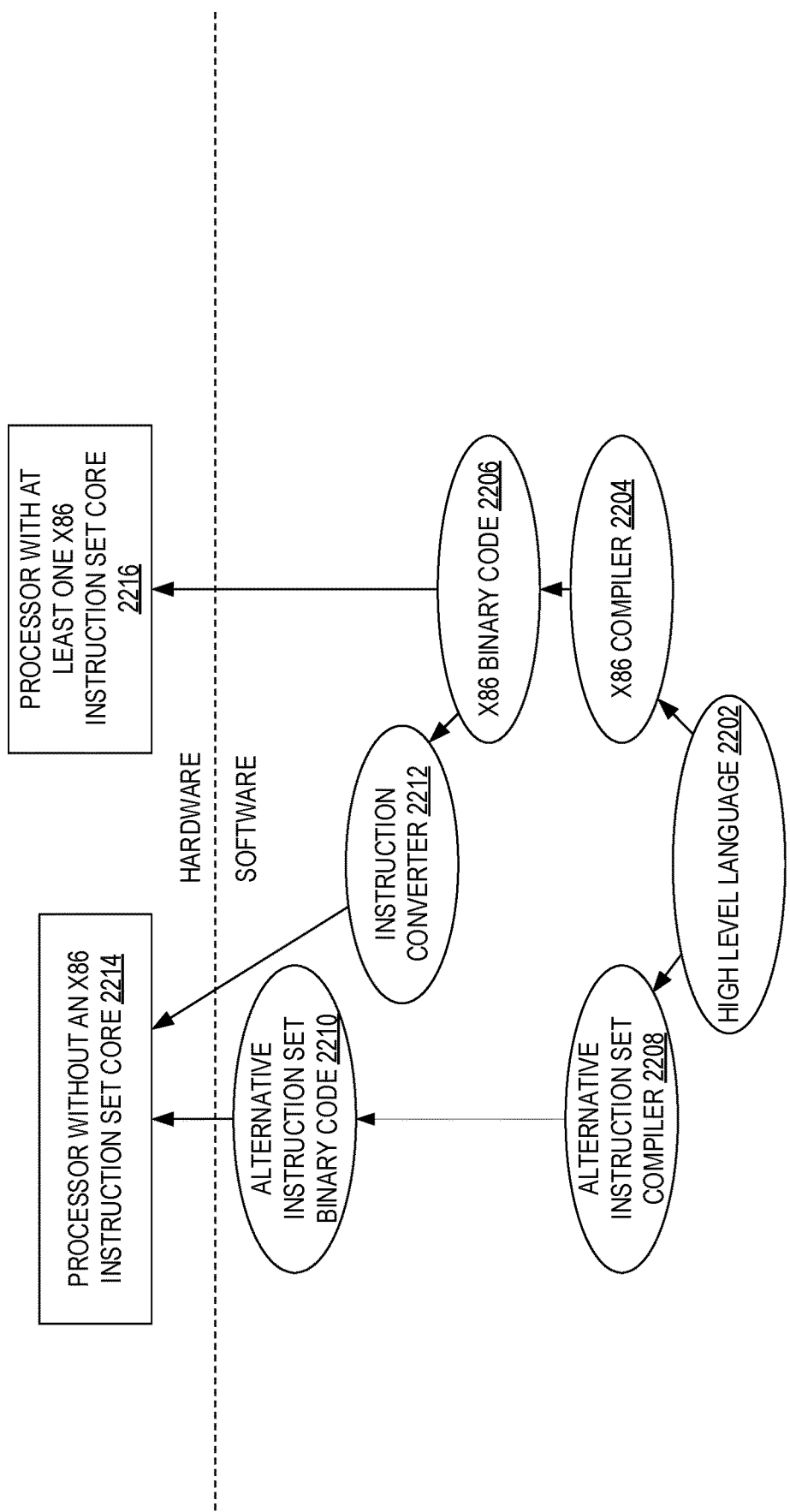

INSTRUCTION SET ARCHITECTURE BASED AND AUTOMATIC LOAD TRACKING FOR OPPORTUNISTIC RE-STEER OF DATA-DEPENDENT FLAKY BRANCHES

CROSS-REFERENCE TO RELATED APPLICATIONS

The present patent application claims the benefit of India Provisional Patent Application No. 202041016867, filed Apr. 20, 2020, and titled: "ISA-Based and Automatic Load Tracking for Opportunistic Override of Data-Dependent Flaky Branches", which is incorporated herein by reference in its entirety.

TECHNICAL FIELD

The disclosure relates generally to electronics, and, more specifically, an embodiment of the disclosure relates to hardware for overriding a prediction for a branch instruction where the outcome of the branch instruction is dependent on a result of a load instruction.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3 illustrates an example format for a load dependent branch table entry according to embodiments of the disclosure.

FIG. 13A is a block diagram illustrating fields for the generic vector friendly instruction formats in FIGS. 12A and 12B according to embodiments of the disclosure.

FIG. 13B is a block diagram illustrating the fields of the specific vector friendly instruction format in FIG. 13A that make up a full opcode field according to one embodiment of the disclosure.

FIG. 13C is a block diagram illustrating the fields of the specific vector friendly instruction format in FIG. 13A that make up a register index field according to one embodiment of the disclosure.

FIG. 15A is a block diagram illustrating both an exemplary in-order pipeline and an exemplary register renaming, out-of-order issue/execution pipeline according to embodiments of the disclosure.

FIG. 15B is a block diagram illustrating both an exemplary embodiment of an in-order architecture core and an exemplary register renaming, out-of-order issue/execution architecture core to be included in a processor according to embodiments of the disclosure.

FIG. 22 is a block diagram contrasting the use of a software instruction converter to convert binary instructions in a source instruction set to binary instructions in a target instruction set according to embodiments of the disclosure.

DETAILED DESCRIPTION

Figure 1:
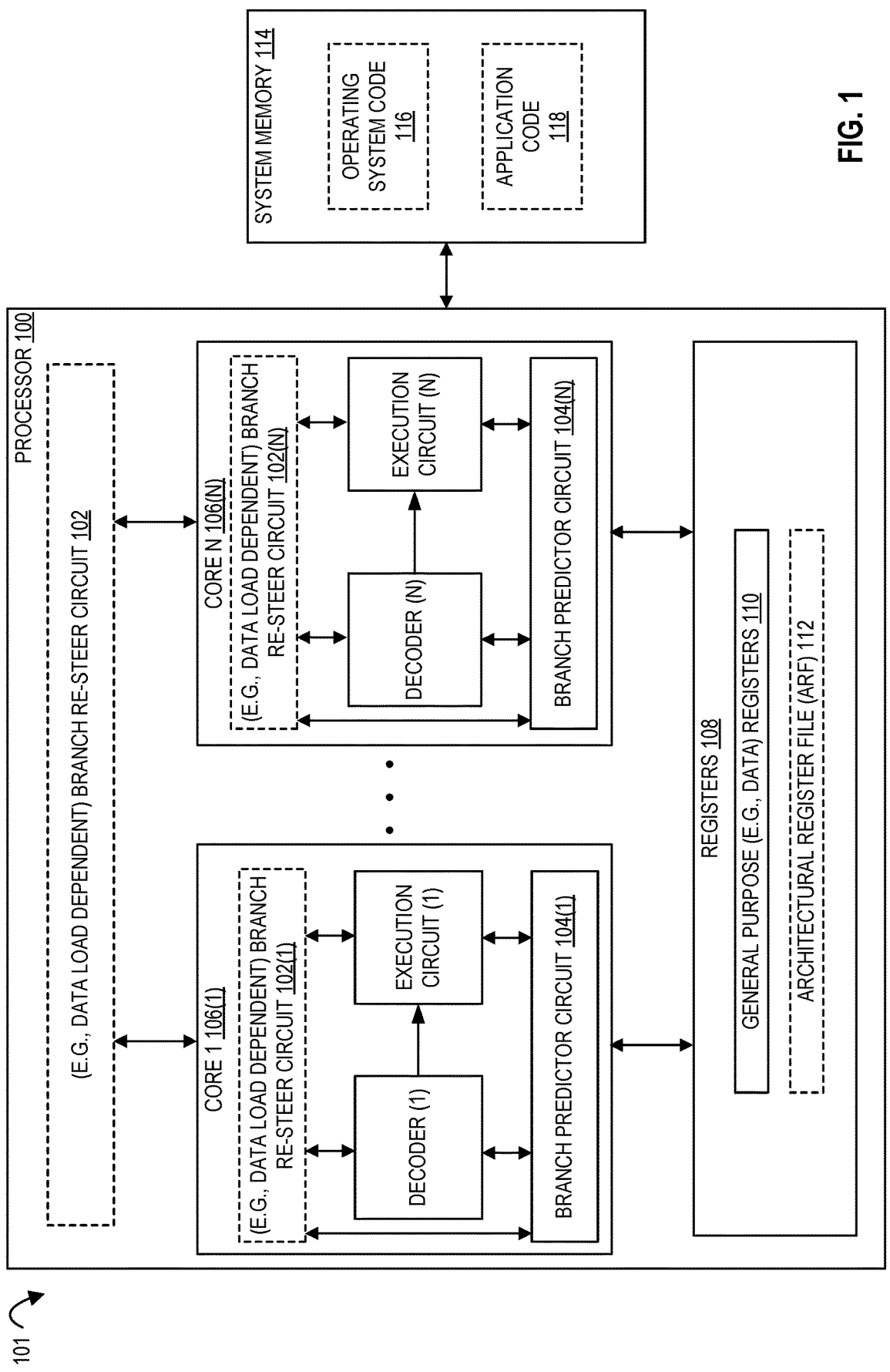
FIG. 1 illustrates a hardware processor including at least one branch predictor circuit and at least one branch re-steer circuit according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In certain embodiments, the operations (e.g., threads) performed include one or more branch operations (e.g., branch instructions).

In certain embodiments, branch operations (e.g., instructions) are either unconditional (e.g., the branch is taken every time the instruction is executed) or conditional (e.g., the direction taken for the branch is dependent upon a condition), for example, where instructions to be executed following a conditional branch (e.g., conditional jump) are not known with certainty until the condition upon which the branch depends is resolved. Here, rather than wait until the condition is resolved, a branch predictor (e.g., branch predictor circuit) of a processor may perform (e.g., speculative execute) a branch prediction to predict whether the branch will be taken or not taken, and/or (e.g., if predicted to be taken), predicts the target instruction (e.g., target address) for the branch. In one embodiment, if the branch is predicted to be taken, the processor fetches and speculatively executes the instruction(s) for the taken direction (e.g., path) of the branch, e.g., the instructions found at the predicted branch target address. The instructions executed following the branch prediction are speculative in certain embodiments where the processor has not yet determined whether the prediction is correct. In certain embodiments, a processor resolves branch instructions at the back end of the pipeline circuitry (e.g., in an execution, retirement, and/or write back unit/circuit). In one embodiment, if a branch instruction is determined to not be taken by the processor (e.g., by the back end), then all instructions (e.g., and their data) presently in the pipeline circuitry behind the taken branch instruction are flushed (e.g., discarded). Certain branch instructions are referred to as indirect branch instructions, e.g., where the branch target (e.g., instruction pointer for that branch target) is stored in a (e.g., branch) register.

In certain (e.g., superscalar) processors (e.g., those with increased out-of-order (OoO) width and depth of the processor pipeline), the accuracy of branch prediction is key to minimizing the lost work from branch mispredictions. In certain embodiments, a branch predictor (e.g., branch predictor circuit) learns from past behavior of branches to predict a next (e.g., incoming) branch. However, in the case of data dependent branches, high value entropy may lead to poor prediction accuracy from the history-based branch predictors.

Embodiments herein utilize branch re-steer to reduce the penalty of mispredictions for branches where the outcome of the branch is dependent on the result of (e.g., only one) load instruction. In one embodiment, such a load instruction is referred to as a feeder load instruction. Certain embodiments herein track the progress of (e.g., feeder) load instruction(s) for a branch instruction in a pipelined processor (e.g., core). Certain embodiments herein provide an extension(s) to an instruction set architecture (ISA) to convey a dependent branch's information (e.g., upon receipt by the pipeline, e.g., upon decode) and if the result of the load operation (e.g., the load value) is available before the branch has entered a certain stage of the pipeline (e.g., the out-of-order part of the pipeline), the actual result is used to compute the branch prediction. In certain embodiments, if the original prediction (e.g., predicted path) given by the branch predictor does not match this load value-based prediction (e.g., load value-based path), the (e.g., front end of) the pipeline is re-steered to the (e.g., correct) path resulting in either avoiding the misprediction or lowering a misprediction penalty by early re-steering of the pipeline. Embodiments herein utilize ISA-based and automatic load tracking for opportunistic re-steer of data-dependent flaky branches.

Certain embodiments herein utilize one or more microarchitectural options that (i) include ISA extensions and compiler hints or (ii) are completely done in the microarchitecture. Certain embodiments herein are directed to novel hardware for tracking loads in a processor's pipeline in order to override a branch prediction based on the actual (and not predicted) load value, for example, with this early override reducing the branch misprediction penalty (e.g., due to pipeline flush) when the (e.g., baseline) branch predictor provides a wrong prediction for such (e.g., single) load data dependent branches.

Certain embodiments convey program behavior to hardware using instruction set (ISA) extensions, for example, detecting data dependent branches purely in hardware without using ISA extensions or tracking a store instruction that generates the load value for getting the data value-based prediction. Certain of these embodiments may work well when the store instruction pointer (IP) is strongly correlated to the load instruction pointer (IP), however any inaccuracy in the store-load relationship prediction may lead to incorrect branch predictions. Moreover, determining the correct dynamic instance of the load IP to forward the store value is also a challenge. To avoid these issues, certain embodiments herein use the actual load value to evaluate a branch direction (e.g., path of multiple paths) instead of a predicted value, e.g., without using compiler analysis of a program and/or without introducing delay in executing a load instruction and a branch instruction to be able to compute the prediction. Certain embodiments herein target cases in programs where the delay between a branch instruction and the load instruction that it is dependent on already exists in the program code (e.g., are not back to back in program code or otherwise are sufficiently far apart). In one embodiment, a compiler encodes this information as part of the load instruction and/or branch instruction which can then use the data when the load is ready. Opportunistically, certain embodiments herein identify in the pipeline that a load has completed (e.g., the data is received in a load buffer) and can provide the value to its dependent branches. In certain embodiments (e.g., where a compiler does not so mark them), the processor hardware (e.g., a branch re-steer circuit) identifies in the pipeline that a load has completed and opportunistically reduces the penalty of a pipeline flush(es). Certain embodiments herein do not require compiler support and/or ISA changes (extensions) as a necessary part of the solution. Certain embodiments herein can utilize ISA changes as discussed herein.

Turning now to the figures, FIG. 1 illustrates a hardware processor 100 including at least one branch predictor circuit 104(1)-104(N) and at least one (e.g., data load dependent) branch re-steer circuit 102, 102(1)-102(N) according to embodiments of the disclosure. Although multiple branch predictor circuits are depicted, a single branch predictor circuit may be utilized for branch predictions for the cores 106(1)-106(N). In one embodiment, branch prediction is distributed with each core including its own local branch predictor 104(1)-104(N). Each local branch predictor 104(1)-104(N) may share data, e.g., history for branch instructions executed by processor 100.

In one embodiment, N is any integer two or greater. Hardware processor 100 is depicted as coupled to a system memory 114, e.g., forming a computing system 101. A core of (e.g., each core 106(1)-106(N) of) hardware processor 100 may include any of an instruction fetch circuit, decoder, execution circuit, or retirement circuit (or other units or circuits discussed herein), for example, as a pipeline circuit of the core.

Depicted hardware processor 100 includes registers 108. Registers 108 may include one or more general purpose (e.g., data) registers 110 to perform (e.g., logic or arithmetic) operations in, for example, additionally or alternatively to access of (e.g., load or store) data in memory 114. Registers 108 may include one or more architectural register files 112. In one embodiment, processor 100 (e.g., a branch predictor thereof) is to populate branch history data (e.g., context data) into one or more register(s) 108 based on the previous execution of instructions, e.g., branch instructions. In another embodiment, the branch history may be saved into system memory 114. Branch history may include a global history of a branch instruction (e.g., including a history of the path taken by a series of branches through the currently executing program code to reach the branch instruction) with an address identifier of the branch instruction (e.g., an instruction pointer value or program counter value associated with the branch instruction). In certain embodiments, the global branch (e.g., path and/or direction) history includes direction information that indicates how often the resolved direction of the branch instruction is taken or not taken, e.g., to provide predictions for future instances of the branch instruction. In certain embodiments, global branch (e.g., path and/or direction) history includes path information that indicates the path (e.g., the instructions executed) to reach the branch instruction for a particular prediction, e.g., a proper subset of the executed instructions to reach the branch instruction for a particular prediction.

System memory 114 may include (e.g., store) one or more of (e.g., any combination of) the following software: operating system (OS) code 116 or application code 118.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. In one embodiment, processor 100 has a single core. In certain embodiments, computing system 101 and/or processor 100 includes one or more of the features and/or components discussed below, e.g., in reference to any Figure herein.

As one example, a branch predictor improves the functioning of a pipelined processor, e.g., by generating a prediction of which path of multiple paths that a to-be executed instance of a (e.g., conditional) branch instruction (e.g., for an "IF" operation in code)) will be taken.

A processor (e.g., microprocessor) may employ the use of pipelining to enhance performance. Within certain embodiments of a pipelined processor, the functional circuitry (e.g., fetch, decode, execute, retirement, etc.) for executing different stages of an instruction operates simultaneously on multiple instructions to achieve a degree of parallelism leading to performance increases over non-pipelined processors. In one embodiment, an instruction fetch unit (e.g., circuit), an instruction decoder (e.g., decode unit or decode circuit), and an instruction execution unit (e.g., circuit) operate simultaneously. During one clock cycle, the instruction execution unit executes a first instruction while the instruction decoder decodes a second instruction and the fetch unit fetches a third instruction in certain embodiments. During a next clock cycle, the execution unit executes the newly decoded instruction while the instruction decoder decodes the newly fetched instruction and the fetch unit fetches yet another instruction in certain embodiments. In this manner, neither the fetch unit nor the decoder need to wait for the instruction execution unit to execute the last instruction before processing new instructions. In certain embodiments (e.g., during a write back stage), the results of the executed instruction(s) (e.g., instructions taken for one path after a branch instruction) are kept (e.g., made visible) if the prediction was correct and discarded (e.g., the effects rolled-back) if the prediction was incorrect.

Embodiments herein utilize a branch re-steer circuit (e.g., branch re-steer circuit 102(1) for core 106(1) and branch re-steer circuit 102(N) for core 106(N)) to re-steer an incorrect prediction, for example re-steering sometime after the branch instruction is input into the core's pipeline but before being send to the (e.g., out-of-order) stages.

Figure 2:
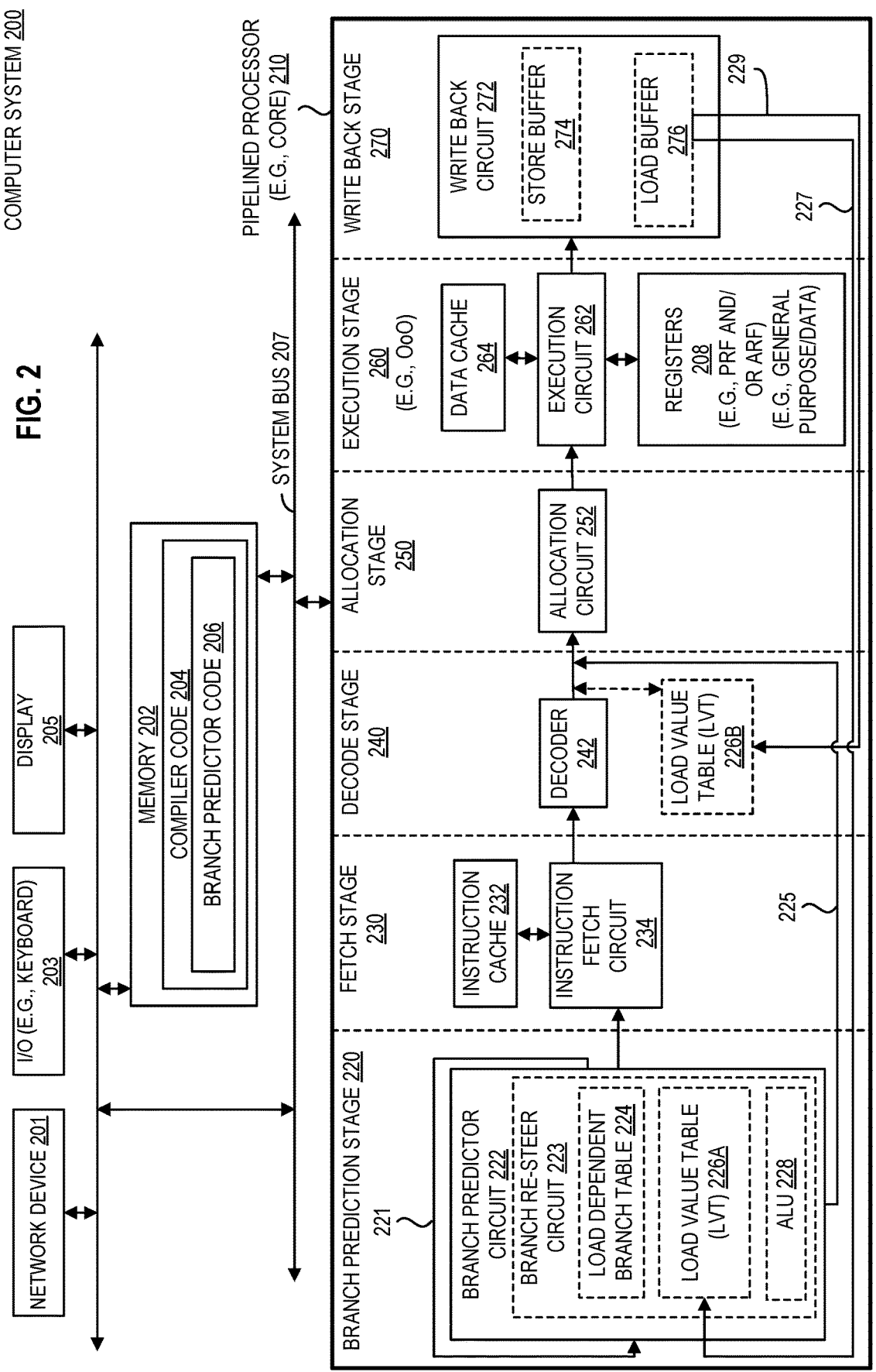
FIG. 2 illustrates a computer system including a branch predictor circuit and a branch re-steer circuit in a pipelined processor according to embodiments of the disclosure.

FIG. 2 illustrates a computer system 200 including a branch predictor circuit 220 and a branch re-steer circuit 222 in a pipelined processor 210 (e.g., pipeline core) according to embodiments of the disclosure. Depicted computer system 200 further includes a network device 201, input/output (I/O) circuit 203 (e.g., keyboard), display 205, and a system bus (e.g., interconnect) 207.

In one embodiment, each core of processor 100 in FIG. 1 is an instance of a processor core 210, where N is any positive integer. In the depicted embodiment, each single processor (e.g., each core 210) includes an instance of branch predictor circuit 220 and/or branch re-steer circuit 222. Branch predictor circuit 220 may include branch re-steer circuit 222 therein. Branch predictor circuit 220 may include a branch target buffer (BTB), a return stack buffer (RSB), history tables, registers, and/or other data storage structures. One or more of these may be only used by a single branch predictor, or they may be maintained and/or used by any branch predictor of multiple branch predictors.

In certain embodiments, branch target buffer stores (e.g., in a branch predictor array) the predicted target instruction corresponding to each of a plurality of branch instructions (e.g., branch instructions of a section of code that has been executed multiple times). In certain embodiments, return stack buffer is to store (e.g., in a stack data structure of last data in is the first data out (LIFO)) the return addresses of any CALL instructions (e.g., that push their return address on the stack). In certain embodiments, history tables store history for each of multiple branches of code being performed by the processor 210. In certain embodiments, registers include a register to store branch global path history and/or a register to store branch global direction history.

In one embodiment, processor 210 is a pipelined processor core that includes a branch prediction stage 220, a fetch stage 230, a decode stage 240, an allocation stage 250, an execution stage 260, and a write back (e.g., retirement) stage 270. Each of the pipelined stages shown in processor core 210 may include varying levels of circuitry. Alternatively, the pipeline stages may be sub-divided into a larger number of stages. Moreover, additional pipeline stages, such as a prefetch stage, instruction pointer generation (IP Gen) stage, etc. may also be included.

In one embodiment, pipelined processor 210 receives an instruction pointer (IP) (for example, via connection (e.g., wire) 221) that identifies the next instruction that is to be input into the processor. For example, an IP generation stage may select instruction pointers (e.g., memory addresses) which identify the next instruction in a program sequence that is to be fetched and executed by the core (e.g., logical core). In one embodiment, the pipelined processor 210 (e.g., IP generation stage) increments the memory address of the most recently fetched instruction by a predetermined amount X (e.g., 1), each clock cycle.

However, in the case of an exception, or when a branch instruction is taken, the pipelined processor 210 (e.g., IP generation stage) may select an instruction pointer identifying an instruction that is not the next sequential instruction in the program order. In certain embodiments, the pipelined processor 210 (e.g., branch prediction stage 220) predicts whether a conditional branch instruction is taken, for example, to decrease branch penalties.

The fetch stage 230, as depicted in FIG. 2, includes an instruction fetch circuit 234 that accepts instruction pointers from upstream in the pipeline processor (e.g., from the branch prediction stage 220) and fetches the respective instruction from memory 202 or instruction cache 232. The decode stage 240 performs decode operations with decoder 242 to decode an instruction into a decoded instruction (e.g., into micro-operations). The allocation stage 250, as depicted in FIG. 2, performs allocation operations with allocation circuit 252, e.g., performing register renaming and dispatch (e.g., scheduling). In one embodiment, an ISA supports a certain number of logical registers (e.g., ARF of registers 208 in FIG. 2 or ARF 112 in FIG. 1) that are mapped to a certain (e.g., larger) number of physical registers, for example, with each register of the ARF pointing to a particular physical register file (PRF) in registers 208. In one embodiment, the logical identifier (e.g., "name") of the registers are mapped to the physical identifier (e.g., "name") of the registers, e.g., and these mappings can be updated. In one embodiment, the instruction dispatch includes reserving different resources that the instruction will use, including execution resources, entries in a reorder buffer (ROB), issue queue, store buffer 274, load buffer 276, etc. In certain embodiments, if resources are not available, the corresponding instruction is stalled until some other instruction releases the required resources. The execution stage 260, as depicted in FIG. 2, performs an operation with execution circuit 262 (e.g., accessing registers 208, memory 202, store buffer 274, and/or load buffer) as specified by a decoded instruction.

The write back stage, as depicted in FIG. 2, retires the executed instruction with write back circuit 272, e.g., with the results of the executed instruction(s) (e.g., instructions taken for one direction after a conditional branch) are kept (e.g., made visible) if the branch prediction was correct and discarded (e.g., the effects rolled-back) if the branch prediction was incorrect. A store request by execution circuit 262 may cause the data to be stored in store buffer 274, for example, with store buffer 274 to then cause that data to be stored in its final storage destination, e.g., destination within register(s) 208, memory 202, and/or data cache 264. A load request by execution circuit 262 may cause the data to be loaded into load buffer 276, for example, with load buffer 276 to then cause that data to be loaded in its requested storage destination, e.g., destination within register(s) 208, memory 202, and/or data cache 264. In alternative embodiments, the pipelined stages described above may also include additional operations.

Branch predictor circuit 222 (e.g., Branch Predictor Unit (BPU)) may provide the pipeline (e.g., fetch stage 230) with the instruction corresponding to a predicted taken direction for a branch instruction. In certain embodiments, the branch predictor circuit 222 includes or accesses storage having one or more entries, with each entry capable of storing data identifying a branch instruction and corresponding data identifying the predicted direction (e.g., taken path and/or not taken path). In certain embodiments, the branch predictor circuit 222 predicts a branch target of the branch instruction.

In one embodiment, the branch instructions stored in the branch predictor circuit 222 are pre-selected by a compiler from code to be executed. In certain embodiments, the compiler code 204, as shown stored in the memory 202 of FIG. 2, includes a sequence of code that, when executed, translates source code of a program written in a high-level language into executable machine code. In one embodiment, the compiler code 204 further includes additional branch predictor code 206 that predicts a direction (e.g., taken or not taken) and/or a target instruction for branch instructions (for example, path of a branch instruction that is likely to be taken (e.g., pre-selected branch instructions)). The branch predictor circuit 222 (e.g., BTB thereof) is thereafter updated with a direction prediction and/or a predicted target instruction for a branch instruction.

Depicted core (e.g., branch predictor circuit 222 thereof) includes access to one or more registers (e.g., registers 208). In certain embodiments, registers 208 include one or more of general purpose register(s) and/or branch prediction history registers.

In certain embodiments, branch re-steer circuit 223 is included to reduce the penalty of mispredictions for branches where the outcome of the branch is dependent on the result of one or more monitored load instructions. In one embodiment, such a load instruction is referred to as a feeder load instruction. Certain embodiments herein track the progress of (e.g., feeder) load instruction(s) for a branch instruction in a pipelined processor (e.g., core), e.g., as discussed herein. In certain embodiments, branch re-steer circuit 223 populates and/or updates a load dependent branch table 224, e.g., to indicate a branch instruction and/or the load instruction whose result the branch instruction depends on. Examples of the identification (e.g., detection) and/or marking of such instructions is discussed below.

In certain embodiments, branch re-steer includes use of one or more of the following components: (1) a mechanism to detect load (e.g., instruction) data dependent (e.g., instruction) branches, (2) a load dependent branch table 224 to store learned load instructions (e.g., the IPs thereof) that feed a value governing the outcome of the data dependent branches, and (3) a load value table (LVT) 226A (which may include a copy of all or a subset of the load value table (LVT) in load value table 226B). In one embodiment, load value table 226B is located between decoder 242 and allocation circuit 252. In another embodiment, load value table 226B is located within the stage where a re-steer check with the write back of the monitored load is performed. In certain embodiments, the load instruction (e.g., as indicated by a field or other indication for a load instruction) provides the load value to load value table (LVT) (e.g., 226A and/or 226B) when it is ready for write back (e.g., when the load value is received in load buffer 276). In certain embodiments, if the load value is available before the branch enters a certain stage (e.g., before an OOO part of the pipeline, such as, but not limited to, reservation station, reorder buffer, etc.), a re-steer is made based on the load value. In certain embodiments, the result from a load instruction (e.g., the load value) is read from a load value table that is separate from the final storage destination (e.g. and separate from a load buffer in a write back stage).

In certain embodiments, branch re-steer circuit 223 is to populate respective entries in load dependent branch table 224 with a branch instruction that is to be monitored for possible re-steering as disclosed herein. In one embodiment, branch re-steer circuit 223 adds an entry in load dependent branch table 224 that identifies a branch instruction that is to be monitored, e.g., by including the instruction pointer (IP) for that branch instruction into the entry and/or the instruction pointer (IP) for its feeder load instruction into the entry. In one embodiment, the format for the load dependent branch table entry is the format 300 in FIG. 3.

In certain embodiments, a branch instruction having a feeder load instruction dependency is identified by a compiler. In certain embodiments, a branch instruction having a feeder load instruction dependency is identified by analyzing the registers (e.g., ARF).

As one example, a load instruction is input into (e.g., the pipeline) of processor 210 (e.g., input into branch predictor circuit and/or instruction fetch stage 230) and (e.g., the IP of that load instruction) is checked within load dependent branch table 224 to determine if it corresponds to a monitored branch instruction. If not, in certain embodiments, the flow of the processor 210 continues through the stages. If yes, in certain embodiments, the branch re-steer circuit 223 is to mark the load instruction for monitoring of its resultant (e.g., result). In one embodiment, the branch re-steer circuit 223 is to allocate an entry in load value table (e.g., 226A and/or 226B) and cause the resultant of that load instruction to be stored into the entry in the load value table on receipt (e.g., on receipt within load buffer 276). In this example, a branch instruction is (e.g., speculatively) input into (e.g., the pipeline) of processor 210 (e.g., input into branch predictor circuit) and (e.g., the IP of that branch instruction) is checked within load dependent branch table 224 to determine if has a corresponding, monitored load instruction. If not, in certain embodiments, the flow of the processor 210 continues through the stages (e.g., according to speculative execution). If yes, in certain embodiments, the branch re-steer circuit 223 is to cause one or more checks (for example, via connection (e.g., wire) 225) to see if the resultant (e.g., result) of the load instruction is now ready (e.g., when not ready during an initial stage(s) of the pipeline process for that branch instruction). In one embodiment, receipt of the load data into load buffer 276 causes the load data to be sent (e.g., from write back stage 270 for the load instruction) to the corresponding entry in load value table (e.g., based on the mapping for a load IP to a particular load value table (LVT) index). For example, the load value being sent from load buffer 276 to LVT 226A via connection (e.g., wire) 227 and/or from load buffer 276 to LVT 226B via connection (e.g., wire) 229. In one embodiment, the branch re-steer circuit 223 is to cause (e.g., on receipt of its monitored feeder load result into a load value table) a comparison of the result from the load instruction (e.g., between a decode of the branch instruction with the decoder 242 and an execution of the branch instruction with the execution circuit 262), and when the predicted path differs from a (e.g., actual) path based on the result from the load instruction, re-steer execution of the branch instruction to the path and/or cause execution of the branch instruction for the path based on the result from the load instruction (e.g., without overriding execution of that instance of the branch instruction). In certain embodiments, a load instruction includes an identifier (e.g., index value) of the load value table (LVT) entry to be used for its resultant, for example, with that identifier stored in an entry in load dependent branch table 224. In certain embodiments, a branch instruction includes an identifier (e.g., index value) of the load value table (LVT) entry to be used for the resultant of its feeder load, for example, with that identifier carried through the pipeline with the branch instruction (e.g., carried up until the last point (e.g., stage) where the possible re-steer is checked). In certain embodiments, a possible re-steer is checked (e.g., one or more times) before execution stage 260, before allocation stage 250 allocates execution resources, before scheduling execution, etc. In certain embodiments, the final (e.g., only) check for re-steer is performed after fetch stage 230 or decode stage 240 (e.g., but before allocating or scheduling execution of the branch instruction). The above are merely examples and it should be understood that other point(s) in the pipeline may be chosen, e.g., points before the execution stage 260 or write back stage 270. In certain embodiments, circuitry (e.g., arithmetic logic unit (ALU) 228) is includes to perform operation(s) to determine when the predicted path differs from a path based on the result from the load instruction (e.g., "greater than" comparison operations, "less than" comparison operations, "equal to" comparison operations, etc.), for example, to avoid using execution stage 260 resources. Branch re-steer circuit 223 may cause the flushing of any (e.g., speculative) data for the incorrectly predicted path, e.g., when the predicted path differs from the path based on the result from the load instruction. Branch re-steer circuit 223 may cause the execution (e.g., via re-steering the branch instruction with the result back into a beginning stage (e.g., front end) of the pipeline) of the branch instruction for the actual path based on the result from the load instruction. FIG. 3 illustrates an example format 300 for a load dependent branch table entry according to embodiments of the disclosure. Depicted format 300 includes one or more fields to store (e.g., by branch re-steer circuit): an IP 302 for the branch instruction that is being monitored (e.g., for re-steering an incorrectly predicted path caused by the feeder load instruction), (optional) number 304 of mispredictions for this branch instruction, (optional) confidence score 306 (e.g., with 304 and 306 used in a replacement scheme for predictions), feeder load IP 308 (e.g., and comparison information, such as identifying the operation and value for a comparison of the load value to a (e.g., constant) value), and load value table (LVT) index 310 to identify the element of the corresponding load value table (LVT) where the result for the load instruction is to be (e.g., temporarily) stored. For example, if the branch instruction corresponds to pseudocode of "IF (a>100)" and the feeder load instruction is to load the value of "a" (e.g., from memory), the compare field may store an indication of "greater than" comparison and a value of "100" to cause a comparison (e.g., by ALU 228) of the value of "a" (e.g., sourced from load value table (LVT) table 226A or 226B) to "100" to determine the actual path for the branch instruction based on the result "a" from the load instruction.

Next, describes example schemes for detecting load data dependent branches. The following pseudocode example will be referred to below (where do work can be any operation(s)):

```
a = MEM[x];        //L1: Load that feeds the three "if" branches below
b = MEM[y];        //L2: Load that feeds the third "if" branch below
if(a > 100)        //B1: branch directly dependent on the load value of L1
{
  do_work( );
}
if(a %2 == 0)      //B2: branch directly dependent on the load value of L1
{
   do_work( );
}
if( a == b )       //B3: branch directly dependent on the load value of L1 & L2
{
   do_work( );
}
```

This example includes load data dependent branches B1 and B2 that both use a single load value of L1 ("a") to compute the outcome, and load data dependent branch B3 uses data from two loads to compute its outcome. Branch B3 uses two load values to compute the branch outcome and is not supported by certain embodiments herein to avoid complexity of tracking multiple loads for a single branch instruction, although it should be understood other embodiments track multiple loads according to the disclosure herein for a single branch instruction.

As discussed above, the identification of load data dependent branches (e.g., and thus the population of load dependent branch table 224) may be via (i) a compiler and instruction set architecture (ISA) extensions or (ii) a hardware-based implementation.

Example Implementation Via Compiler/ISA Extensions:

In certain embodiments, the load dependent branch detection is performed by a compiler (e.g., using a data-flow graph) and the ISA extensions discussed herein to enable special handling of load data dependent branches in hardware. In one embodiment, the load instruction is marked and an offset to the branch IP (e.g., program counter (PC)) (or the branch IP itself) is added as extension bits to the load instruction (for example, including one or more other fields, e.g., including, but not limited to, those discussed below in FIGS. 12A-13D).

Figure 4:
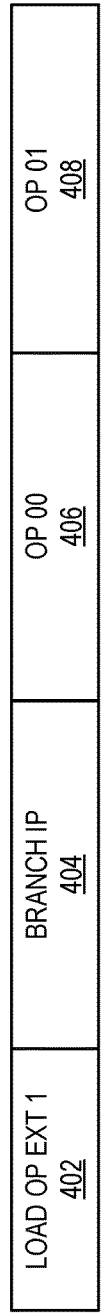
FIG. 4 illustrates an example format for an instruction set architecture (ISA) extension for one dependent branch instruction according to embodiments of the disclosure.

Certain embodiments herein use (e.g., and provide) ISA extensions to indicate (e.g., store) the L1→B1 dependence and L1→B2 dependence discussed above. In the above pseudocode example, certain embodiments herein use a compiler (e.g., the data-flow graph) to detect (e.g., determine) that branches B1 and B2 are directly dependent on load L1's value (e.g., and the other operands are immediate values). FIG. 4 illustrates an example format 400 for an instruction set architecture (ISA) extension for one dependent branch instruction according to embodiments of the disclosure. Depicted format 400 includes one or more fields to store (e.g., by compiler): a (optional) load operation extension 402 (e.g., indicating the branch instruction only depends on one load), a branch IP 404 to identify the branch instruction that is fed by the load instruction, and one or more operations 406, 408, e.g., to indicate the operations to be performed on the resultant of the load data (e.g., "greater than" in the [B1] if (a>100) example above). A first operation indication 406 could be "greater than" or less than and a second operation indication 408 could be "equal to". In the above example, B1 uses a direct comparison of the load value with "100" and B2 uses a modulo operation (%) (e.g., to find a remainder when divided by "2"). In certain embodiments, this information is added to the ISA load instruction extension as fields 406 (e.g., and 408) to enable simple (e.g., via ALU 228 in FIG. 2) computations (e.g., in the front end) for obtaining the branch outcome from the load value.

The data from the ISA extension of format 400 may be used to populate a load dependent branch table (LDBT) entry, e.g., on reading that instruction from the output (e.g., machine code) generated by the compiler.

Figure 5:
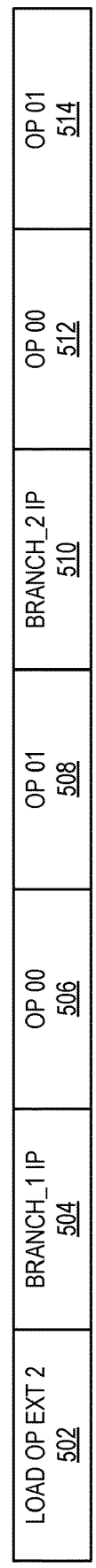
FIG. 5 illustrates an example format for an instruction set architecture (ISA) extension for two dependent branch instructions is according to embodiments of the disclosure.

In the above pseudocode example, certain embodiments herein use a compiler (e.g., the data-flow graph) to detect (e.g., determine) that branch B3 uses two load values to compute the branch outcome. FIG. 5 illustrates an example format 500 for an instruction set architecture (ISA) extension for two dependent branch instructions is according to embodiments of the disclosure. Depicted format 500 includes one or more fields to store (e.g., by compiler): a (optional) load operation extension 502 (e.g., indicating two branch instructions only depends on one load), a first branch IP 504 to identify the first branch instruction that is fed by the load instruction, one or more operations 506, 508, e.g., to indicate the operations to be performed on the resultant of the load data for the first branch instruction (e.g., "greater than" in the [B1] if (a>100) example above), a second branch IP 510 to identify the second branch instruction that is fed by the load instruction, one or more operations 512, 514, e.g., to indicate the operations to be performed on the resultant of the load data for the second branch instruction (e.g., "modulo" and "equal to" in the [B2] if (a %2==0) example above). In certain embodiments, this operations information is added to the ISA load instruction extension as fields 506 and 512 (e.g., and 508 and/or 514) to enable simple (e.g., via ALU 228 in FIG. 2) computations (e.g., in the front end) for obtaining the branch outcome from the load value.

The data from the ISA extension of format 500 may be used to populate a load dependent branch table (LDBT) entry (or entries), e.g., on reading that instruction from the output (e.g., machine code) generated by the compiler.

Figure 6:
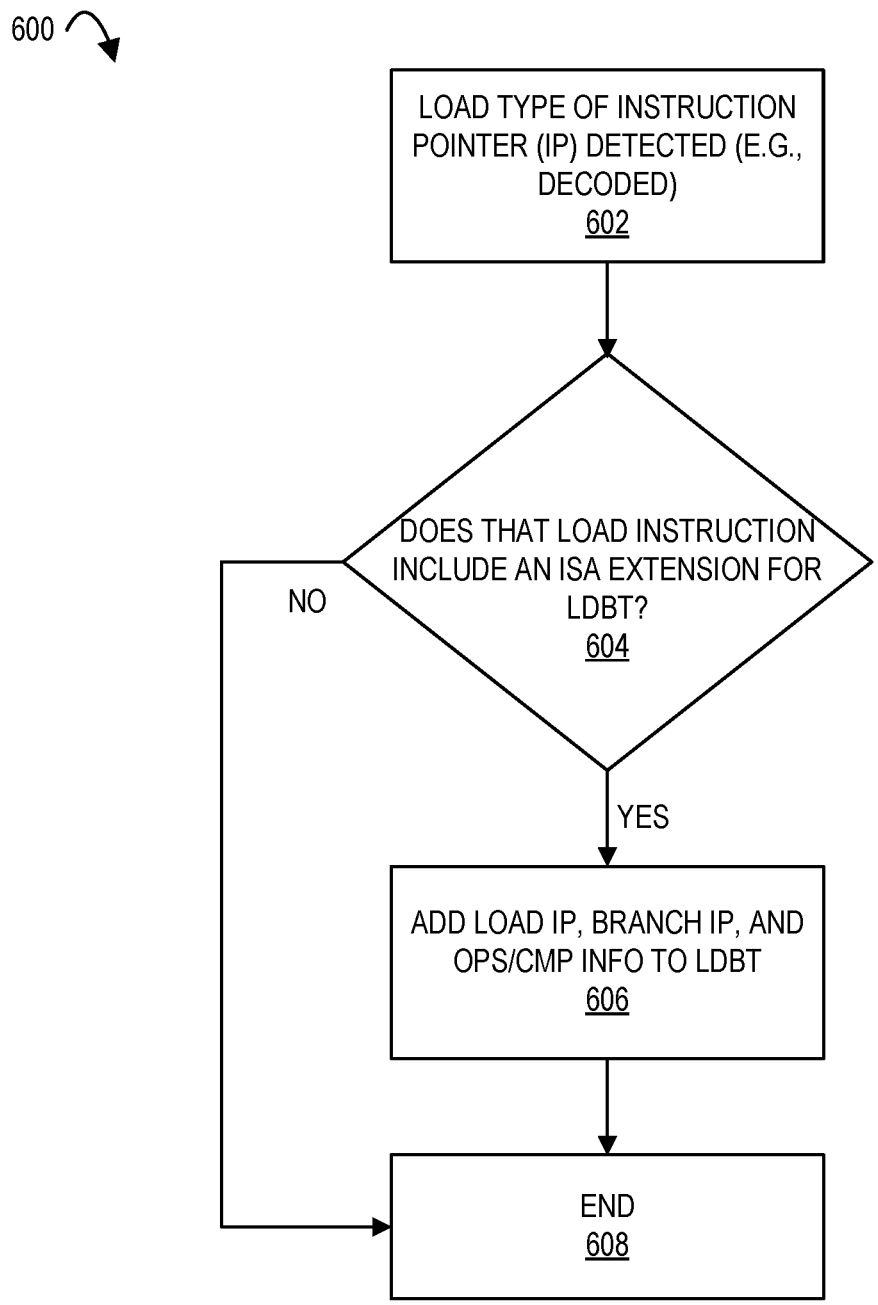
FIG. 6 illustrates a flow diagram for populating a load dependent branch table (LDBT) for branch re-steer according to embodiments of the disclosure.

FIG. 6 illustrates a flow diagram 600 for populating (e.g., on detection (such as during decode) of a feeder load instruction) a load dependent branch table (LDBT) for branch re-steer according to embodiments of the disclosure. Flow 600 includes detecting a load type of instruction 602 (e.g., the decoding of a load instruction and/or its IP), checking if that load instruction includes an ISA extension for branch re-steer 604 (e.g., an ISA extension used to populate a load dependent branch table (LDBT) entry), and if no, ending 608 any further branch re-steer actions of this particular flow, and if yes, causing the population of an entry of a load dependent branch table with data from the ISA extension 606, for example, load IP (e.g., in field 308 in FIG. 3), branch IP (e.g., in field 302 in FIG. 3), comparison (e.g., operations) information (e.g., in field 308 in FIG. 3), etc., and then ending 608 any further branch re-steer actions of this particular flow. This may also cause an allocation of a load value table (LVT) entry and its respective index inserted into the load dependent branch table (LDBT) entry (e.g., in field 310 in FIG. 3).

The examples above illustrate an example design of ISA extensions and flow diagram for actions taken on detection (e.g., decode) of a feeder load instruction in FIG. 2. In certain embodiments, an ISA extension (i) encodes the operations performed on the load value to compute the branch outcome, and (ii), if a load instruction feeds multiple branches, the ISA extension will capture the multiple branch offsets. To enable that different load opcode extensions (LD OP Ext 1 402 and LD OP Ext 2 502) may be used.

In certain embodiments, with one or more fields of this information added to the load instruction as extension, when the load instruction is received by a pipeline (e.g., decoded), the processor (e.g., branch re-steer circuit) adds the load IP and its dependent branches to the LBT, e.g., along with the operations information from the extension bits (e.g., referred to as CMP info in the LBT entry 308 in FIG. 3).

Example Implementation Via a Hardware-Based Implementation:

In certain embodiments, the load dependent branch detection is performed in hardware (e.g., without relying on a compiler or added ISA extensions) to enable special handling of load data dependent branches in hardware. In certain embodiments, a purely hardware-based mechanism is used to detect load dependent branches (e.g., L1→B1 and L1→B2 load data dependence in the above pseudocode example). One embodiment to detect load data dependent branches in hardware involves tracking the data flow through a shadow architectural register file (ARF) or an extension of the ARF entries. In one embodiment, the hardware (e.g., branch re-steer circuit) detects branches that are governed by only one load value, e.g., where if multiple loads are found to be feeding a (e.g., register) value during tracking, the hardware stops tracking that dependence chain (e.g., by invalidating the entry(ies). Similarly, multiple register operations may also be excluded from the dependence chain (e.g., and only operations performed with an immediate operand are permitted).

Figure 7:
FIG. 7 illustrates an example format for architectural register file (ARF) extensions according to embodiments of the disclosure.

In one embodiment the hardware (e.g., branch re-steer circuit) computes the branch outcome from the load value, e.g., with the operations performed on the data value between load and branch instructions tracked. In certain embodiments, once the load dependent branch is detected, its feeder load IP and the sequence of operations is recorded in a load dependent branch table (LDBT) table. FIG. 7 illustrates an example format 700 for architectural register file (ARF) extensions according to embodiments of the disclosure. Depicted format 700 includes one or more fields to store (e.g., by branch re-steer circuit): an identifier of a register 702, a load 704 (e.g., IP for that load instruction) that is accessing the register, and one or more operations 706(0), 706(1), . . . , 706(N), e.g., to indicate the operations. In one embodiment, the one or more operations 706(0)-706(N) indicate when the load value is available, e.g., what operation(s) the ALU (228) is to perform to compute the branch direction for overriding a (e.g., default) branch prediction. For example, with the one or more operations 706(0)-706(N) being the dependent instruction chain between the load and branch. For example, if a load produces R1 by the operations of OP0(R1+5→R2), OP1(R2*7→R3), Jump if R3>20.

The tracking of a load (e.g., and its load value table (LVT) index) through a pipeline as disclosed herein (e.g., via LDBT and LVT) is applicable for both categories of methods of detecting load-dependent branches described above. FIGS. 8-11 discuss various flow diagrams that may be used for branch re-steering. Some or all of the operations for the flows (or other processes described herein, or variations, and/or combinations thereof) may be performed under the control of one or more computer systems configured with executable instructions and are implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some embodiments, one or more (or all) of the operations are performed by a branch re-steer circuit of the other figures.

Figure 8:
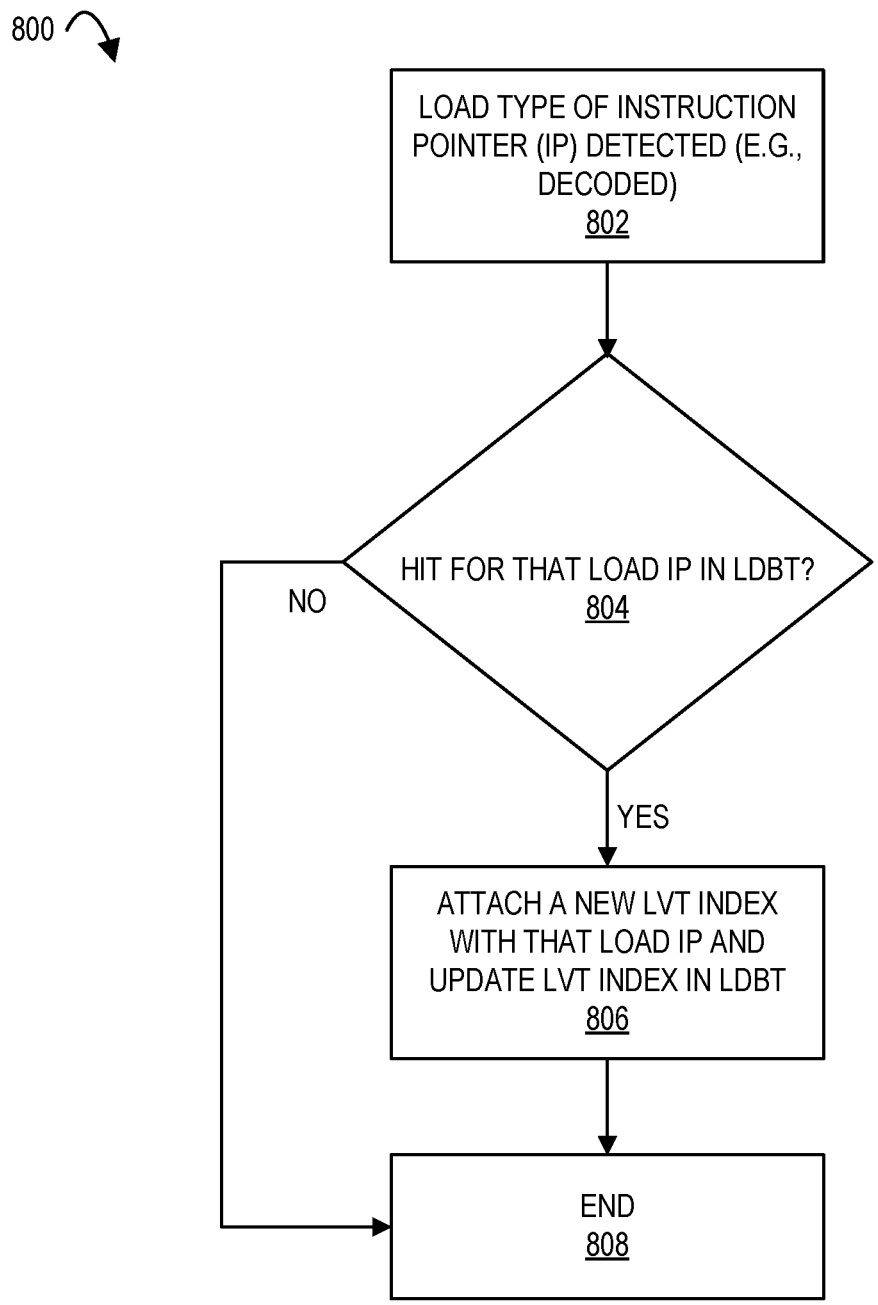
FIG. 8 illustrates a flow diagram triggered by receiving a load instruction when branch re-steer is enabled according to embodiments of the disclosure.

FIG. 8 illustrates a flow diagram 800 triggered by receiving (e.g., fetching) a load instruction when branch re-steer is enabled according to embodiments of the disclosure. Depicted flow 800 includes detecting a load type of instruction 802 (e.g., the decoding of a load instruction and/or its IP), checking if that load instruction (e.g., IP) is present in an entry in load dependent branch table (LDBT) 804, and if no, ending 808 any further branch re-steer actions of this particular flow, and if yes, allocating a new load value table (LVT) entry and it causing the identifier (e.g., index) for that load value table (LVT) entry to be stored within the corresponding entry in the LDBT table (e.g., in field 310 in FIG. 3) (e.g., such that each load iteration causes a new LVT index to be used in the corresponding LDBT entry) 806, and then ending 808 any further branch re-steer actions of this particular flow.

Figure 9:
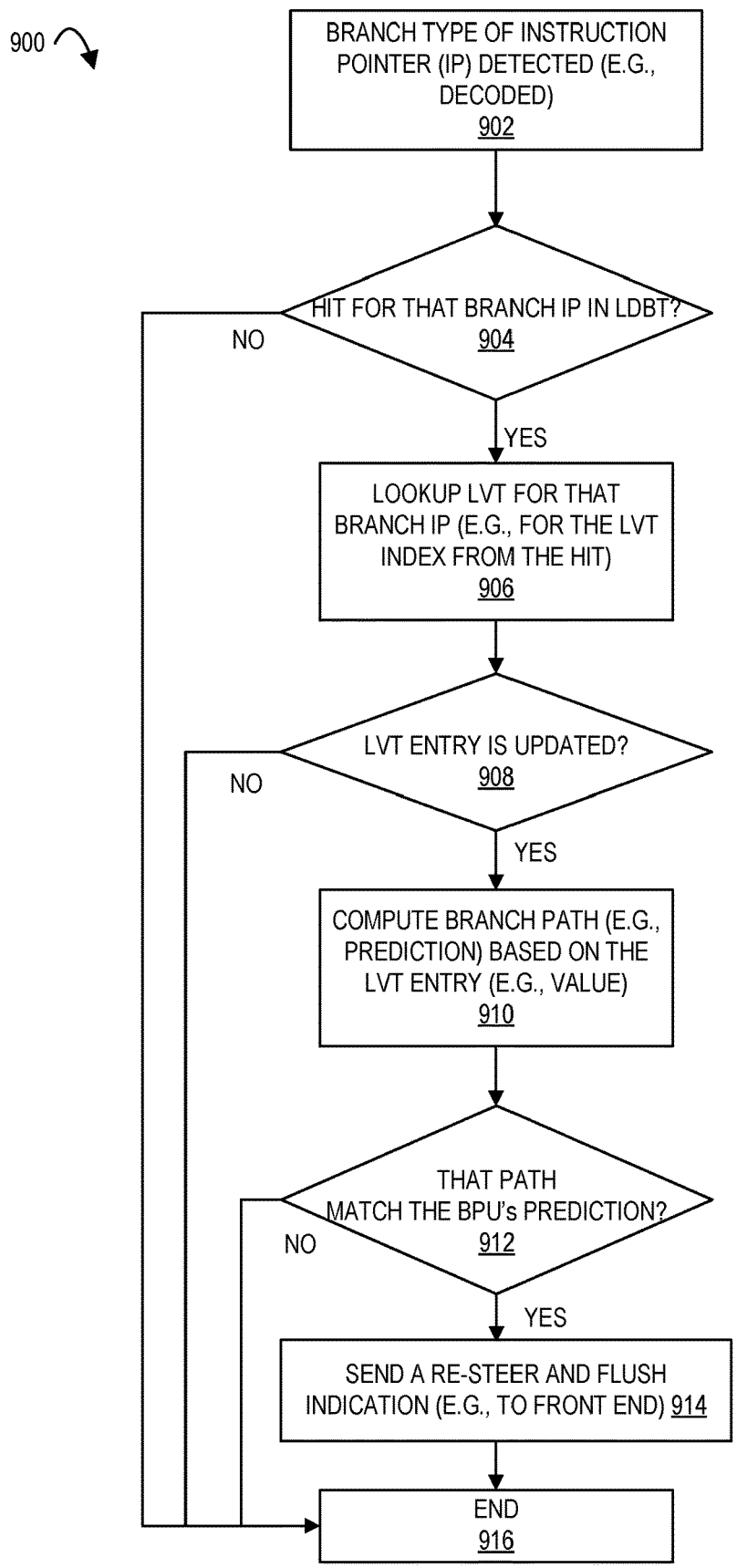
FIG. 9 illustrates a flow diagram triggered by receiving a branch instruction when branch re-steer is enabled according to embodiments of the disclosure.

FIG. 9 illustrates a flow diagram 900 triggered by receiving (e.g., fetching) a branch instruction when branch re-steer is enabled according to embodiments of the disclosure. Depicted flow 900 includes detecting a branch type of instruction 902 (e.g., the decoding of a branch instruction and/or its IP or detecting a branch instruction taking a predicted path in the pipeline of a processor), checking if that branch instruction (e.g., IP) is present in an entry in load dependent branch table (LDBT) 904 (e.g., in field 302 in FIG. 3), and if no, ending 916 any further branch re-steer actions of this particular flow, and if yes, performing a lookup in the load value table (LVT) for the feeder data identified by the load value table (LVT) index in the entry in load dependent branch table (LDBT) 906, then checking if the LVT entry is updated (e.g., has the current load data) 908, and if no, ending 916 any further branch re-steer actions of this particular flow, and if yes, performing the branch path based on the data (e.g., current load data) from the load instruction 910, then checking if the branch path based on the data matches the predicted branch path 912, and if no, ending 916 any further branch re-steer actions of this particular flow, and if yes, sending (e.g., to fetch stage of the pipeline) a re-steer and/or flush indication to cause execution of the (e.g., correct) branch instruction for the path based on the data (e.g., current load data) (e.g., and to cancel execution of the branch instruction for the (e.g., incorrect) path based on the prediction 914, and then ending 916 any further branch re-steer actions of this particular flow (e.g., by marking the load data as stale now).

Figure 10:
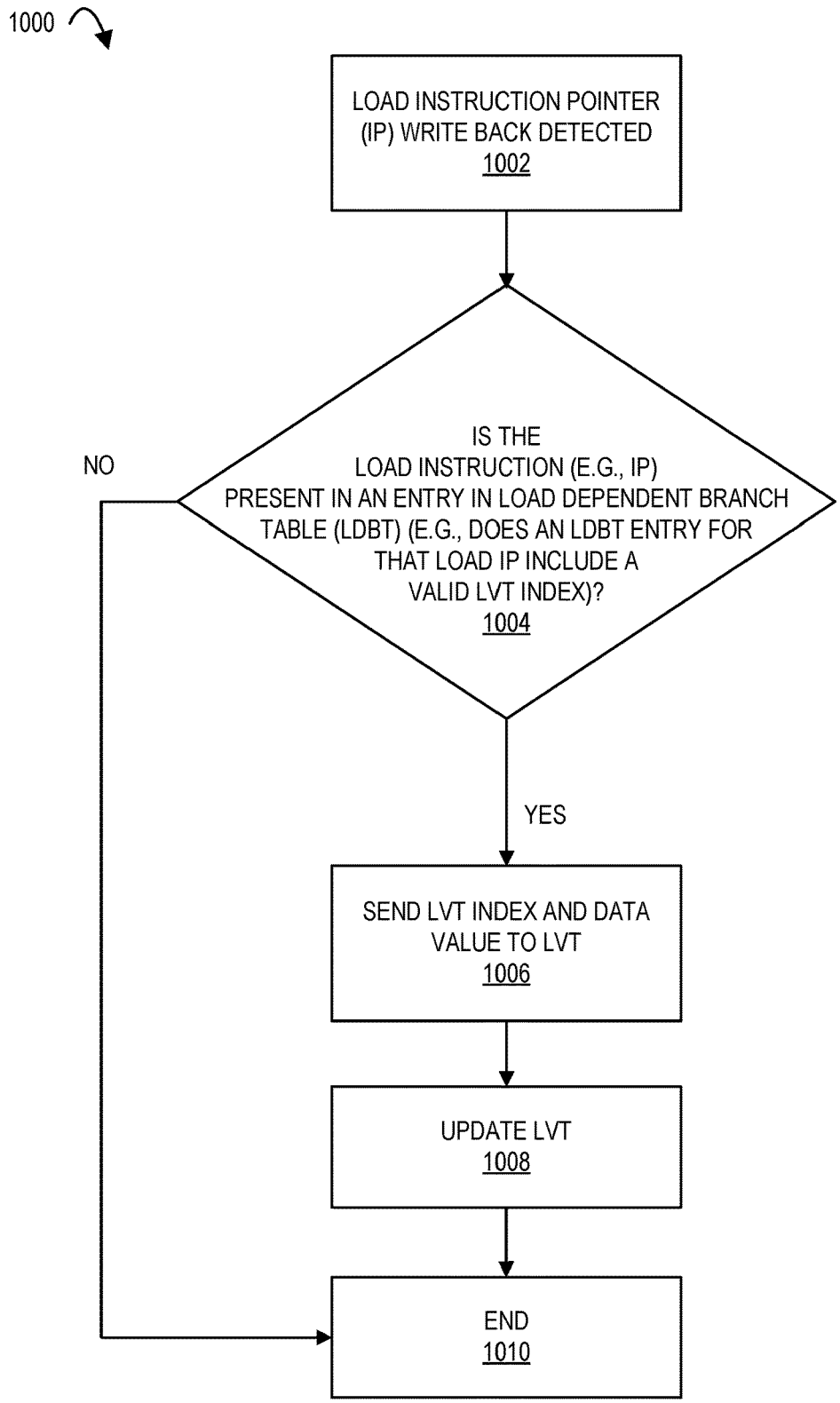
FIG. 10 illustrates a flow diagram triggered by a write back for a load instruction when branch re-steer is enabled according to embodiments of the disclosure.

FIG. 10 illustrates a flow diagram 1000 triggered by a write back for a load instruction when branch re-steer is enabled according to embodiments of the disclosure. Depicted flow 1000 includes detecting a write back for a load type of instruction 1002, checking if that load instruction (e.g., IP) is present in an entry in load dependent branch table (LDBT) (e.g., does an LDBT entry for that load IP include a valid LVT index) 1004, and if no, ending 1010 any further branch re-steer actions of this particular flow, and if yes, sending the resultant data from the write back for the load instruction to the LVT (e.g., along with the LVT index) to the LVT (or plurality of LVTs) 1006, updating that LVT entry with the resultant data 1008, and then ending 1010 any further branch re-steer actions of this particular flow. In one embodiment, an LVT index is assigned to a load instruction (e.g., at 806 in FIG. 8) and later, when the load is doing writeback, only the load instruction(s) that have an (e.g., valid) LVT index are to send the data value to the LVT (e.g., at 1006 in FIG. 10).

Figure 11:
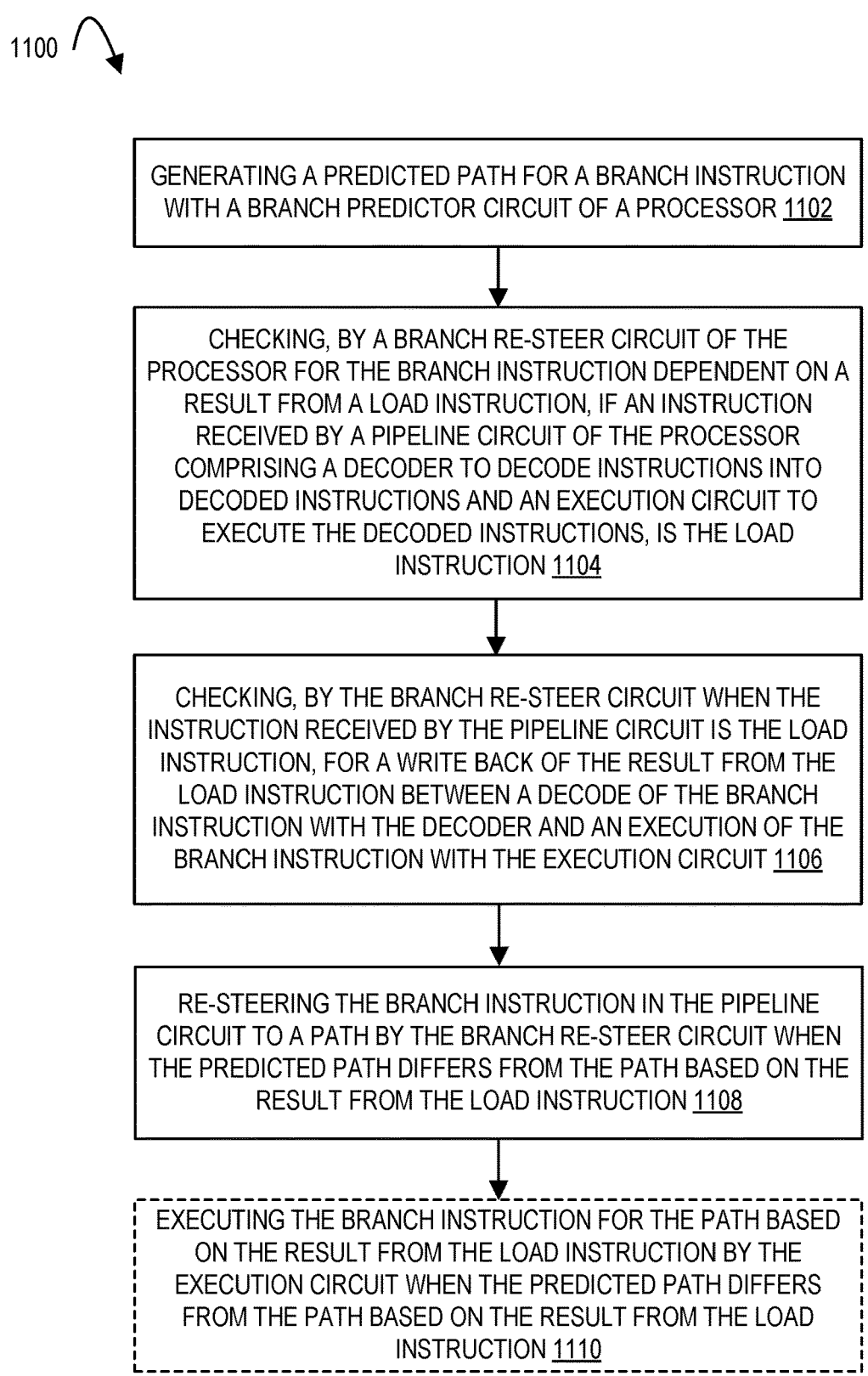
FIG. 11 illustrates a flow diagram for branch re-steering according to embodiments of the disclosure.

FIG. 11 illustrates a flow diagram 1100 for branch re-steering according to embodiments of the disclosure. Depicted flow 1100 includes generating a predicted path for a branch instruction with a branch predictor circuit of a processor 1102, checking, by a branch re-steer circuit of the processor for the branch instruction dependent on a result from a load instruction, if an instruction received by a pipeline circuit of the processor comprising a decoder to decode instructions into decoded instructions and an execution circuit to execute the decoded instructions, is the load instruction 1104, checking, by the branch re-steer circuit when the instruction received by the pipeline circuit is the load instruction, for a write back of the result from the load instruction between a decode of the branch instruction with the decoder and an execution of the branch instruction with the execution circuit 1106, re-steering the branch instruction in (e.g., a front end of) the pipeline circuit to a path by the branch re-steer circuit when the predicted path differs from the path based on the result from the load instruction 1108, and (optionally) executing the branch instruction for the actual path based on the result from the load instruction by the execution circuit when the predicted path differs from the actual path based on the result from the load instruction 1110 (e.g., the branch instruction continues down the pipeline circuit and executes in the execution circuit(s) in a back end of the pipeline circuit).

In certain embodiments, when an instruction enters (e.g., the front end of) a pipeline, its IP is checked for a match against the load IPs in an LDBT, and, if there is a match, the load instruction is marked with an LVT index. The LVT index may be chosen in a round-robin fashion or based on availability. In certain embodiments, the assigned LVT index is also stored in the LDBT in the corresponding entry. In certain embodiments, when the load instruction gets the load value from the memory pipeline (e.g., and into the load buffer), the value is updated (e.g., in the front end) at the LVT indexed slot of the LVT table.

In certain embodiments, at the time of branch instruction fetch, the branch IP is searched in the LBT and if there is a hit, the LVT index is read from the table, e.g., and then the LVT is looked up at the LVT index for the load value. In certain embodiments, if the load instruction has written back a value in the LVT, the computation based on the load value and branch compare conditions produces the expected branch outcome, e.g., and when this outcome is different than what the branch predictor had predicted, a re-steer is made and the front end (e.g., front end unit 1530 in FIG. 15B) is re-steered. Thus, in certain embodiments, a re-steer is resolving a branch with the real load data value. Certain embodiments herein do not eliminate the branch execution in the pipeline (e.g., OoO section of the pipeline), but due to this high accuracy, enable the re-steer in the later portion of the front end. This increases the coverage because the re-steer is possible even when the load and branch are (e.g., slightly) closer in the program flow or the load write back is (e.g., a little) delayed, e.g., due to out-of-order effects or cache misses. This later re-steering reduces the misprediction penalty by doing the front end re-steering earlier than the branch execution, for example, where a branch misprediction penalty (e.g., length of time) (e.g., BP point in time re-steer and/or allocation point in time re-steer) versus a front end re-steer penalty is significantly lower than the former. Certain embodiments herein focus on overriding the (e.g., default) branch prediction with a load value-based prediction (e.g., that is known to be more accurate since it is based on the load value). Certain embodiments herein do not eliminate the branch's execution in the (e.g., back end of the) pipeline, for example, because it is required for correctness. For example, to save on storage, fewer number of tag bits may be used in LDBT to match branch IP or load IP, which can result in aliasing and false hits. Certain of those embodiments still perform the overriding of prediction because there is a hit, e.g., the overriding may not be correct in some implementations where aliasing is allowed in LDBT.

In certain embodiments, before a branch enters a certain stage of the pipeline (e.g., the OOO section of the pipeline), the LVT can be looked up (e.g., again) to see if the load value is available and the branch outcome can be computed for the re-steer. To allow a faster lookup, multiple LVT copies can be maintained (e.g., one at front end and another just before allocation stage). In certain embodiments, the LVT index is sent (e.g., carried) with the branch instruction through the pipeline, e.g., until the final check point (e.g., allocation stage in the above example). In certain embodiments, the LVT copy kept at allocation stage (e.g., LVT 226B in FIG. 2) is minimal in that it only maintains the overriding outcome. In certain embodiments, when the corresponding LVT entry is being updated upon load writeback, the overriding outcome can be computed and sent over to this LVT copy. As a design choice, the computation (e.g., by ALU 228 in FIG. 2) can be done just in time at the time of branch prediction or as soon as the load value is available. In certain embodiments using the LVT copy, the outcome is to be computed and sent over to the LVT copy from LDBT, e.g., to avoid replication overhead of the computation circuitry (e.g., ALU 228 in FIG. 2).

Exemplary architectures, systems, etc. that the above may be used in are detailed below.

At least some embodiments of the disclosed technologies can be described in view of the following examples:

Example 1. A processor comprising:
  a pipeline circuit comprising a decoder to decode instructions into decoded instructions and an execution circuit to execute the decoded instructions;
  a branch predictor circuit to generate a predicted path for a branch instruction; and a branch re-steer circuit to, for the branch instruction dependent on a result from a load instruction, check if an instruction received by the pipeline circuit is the load instruction, and when the instruction received by the pipeline circuit is the load instruction, check for a write back of the result from the load instruction between a decode of the branch instruction with the decoder and an execution of the branch instruction with the execution circuit, and when the predicted path differs from a path based on the result from the load instruction, re-steer the branch instruction in the pipeline circuit to the path and cause execution of the branch instruction for the path based on the result from the load instruction.

Example 2. The processor of example 1, wherein the branch re-steer circuit is to check for the write back of the result in a load value table that is separate from a final storage destination for the result.

Example 3. The processor of example 2, wherein the branch re-steer circuit is to assign an index value for an entry in the load value table for the result of the load instruction when the instruction received by the pipeline circuit is the load instruction, and cause the index value to be sent into the pipeline circuit as a field of the branch instruction.

Example 4. The processor of example 3, wherein the branch re-steer circuit is to update an entry for the branch instruction in a load dependent branch table with the index value when the instruction received by the pipeline circuit is the load instruction.

Example 5. The processor of example 3, wherein the branch re-steer circuit is to assign the index value for a second branch instruction that is also dependent on the result from the load instruction.

Example 6. The processor of example 1, wherein the re-steer of the branch instruction is to occur at an allocation stage of the pipeline circuit that assigns the execution circuit to execute the branch instruction.

Example 7. The processor of example 6, wherein the re-steer of the branch instruction comprises a flush of data for the branch instruction for the predicted path from the pipeline circuit up to the allocation stage.

Example 8. The processor of example 1, further comprising circuitry, separate from an execution stage comprising the execution circuit of the pipeline circuit, to perform one or more operations to determine if the predicted path differs from the path based on the result from the load instruction.

Example 9. A method comprising:
generating a predicted path for a branch instruction with a branch predictor circuit of a processor;
checking, by a branch re-steer circuit of the processor for the branch instruction dependent on a result from a load instruction, if an instruction received by a pipeline circuit of the processor comprising a decoder to decode instructions into decoded instructions and an execution circuit to execute the decoded instructions, is the load instruction;
checking, by the branch re-steer circuit when the instruction received by the pipeline circuit is the load instruction, for a write back of the result from the load instruction between a decode of the branch instruction with the decoder and an execution of the branch instruction with the execution circuit;
re-steering the branch instruction in the pipeline circuit to a path by the branch re-steer circuit when the predicted path differs from the path based on the result from the load instruction; and
executing the branch instruction for the path based on the result from the load instruction by the execution circuit when the predicted path differs from the path based on the result from the load instruction.

Example 10. The method of example 9, wherein the checking for the write back comprises checking for the write back of the result in a load value table that is separate from a final storage destination for the result.

Example 11. The method of example 10, further comprising:
assigning, by the branch re-steer circuit, an index value for an entry in the load value table for the result of the load instruction when the instruction received by the pipeline circuit is the load instruction; and
causing the index value to be sent into the pipeline circuit as a field of the branch instruction.

Example 12. The method of example 11, further comprising updating, by the branch re-steer circuit, an entry for the branch instruction in a load dependent branch table with the index value when the instruction received by the pipeline circuit is the load instruction.

Example 13. The method of example 11, further comprising assigning, by the branch re-steer circuit, the index value for a second branch instruction that is also dependent on the result from the load instruction.

Example 14. The method of example 9, wherein the re-steering of the branch instruction occurs at an allocation stage of the pipeline circuit that assigns the execution circuit to execute the branch instruction.

Example 15. The method of example 14, wherein the re-steering of the branch instruction comprises a flush of data for the branch instruction for the predicted path from the pipeline circuit up to the allocation stage.

Example 16. The method of example 9, further comprising performing one or more operations to determine if the predicted path differs from the path based on the result from the load instruction with circuitry separate from an execution stage comprising the execution circuit of the pipeline circuit.

Example 17. A non-transitory machine readable medium that stores code that when executed by a machine causes the machine to perform a method comprising:
generating a predicted path for a branch instruction with a branch predictor circuit of a processor;
checking, by a branch re-steer circuit of the processor for the branch instruction dependent on a result from a load instruction, if an instruction received by a pipeline circuit of the processor comprising a decoder to decode instructions into decoded instructions and an execution circuit to execute the decoded instructions, is the load instruction;
checking, by the branch re-steer circuit when the instruction received by the pipeline circuit is the load instruction, for a write back of the result from the load instruction between a decode of the branch instruction with the decoder and an execution of the branch instruction with the execution circuit;
re-steering the branch instruction in the pipeline circuit to a path by the branch re-steer circuit when the predicted path differs from the path based on the result from the load instruction; and
executing the branch instruction for the path based on the result from the load instruction by the execution circuit when the predicted path differs from the path based on the result from the load instruction.

Example 18. The non-transitory machine readable medium of example 17, wherein the checking for the write back comprises checking for the write back of the result in a load value table that is separate from a final storage destination for the result.

Example 19. The non-transitory machine readable medium of example 18, the method further comprising:
assigning, by the branch re-steer circuit, an index value for an entry in the load value table for the result of the load instruction when the instruction received by the pipeline circuit is the load instruction; and
causing the index value to be sent into the pipeline circuit as a field of the branch instruction.
Example 20. The non-transitory machine readable medium of example 19, the method further comprising updating, by the branch re-steer circuit, an entry for the branch instruction in a load dependent branch table with the index value when the instruction received by the pipeline circuit is the load instruction.
Example 21. The non-transitory machine readable medium of example 19, the method further comprising assigning, by the branch re-steer circuit, the index value for a second branch instruction that is also dependent on the result from the load instruction.
Example 22. The non-transitory machine readable medium of example 17, wherein the re-steering of the branch instruction occurs at an allocation stage of the pipeline circuit that assigns the execution circuit to execute the branch instruction.
Example 23. The non-transitory machine readable medium of example 22, wherein the re-steering of the branch instruction comprises a flush of data for the branch instruction for the predicted path from the pipeline circuit up to the allocation stage.
Example 24. The non-transitory machine readable medium of example 17, the method further comprising performing one or more operations to determine if the predicted path differs from the path based on the result from the load instruction with circuitry separate from an execution stage comprising the execution circuit of the pipeline circuit.
Example 25. A system comprising:
a memory to store a branch instruction and a load instruction; and
a processor core, coupled to the memory, comprising:
  a pipeline circuit comprising a decoder to decode instructions into decoded instructions and an execution circuit to execute the decoded instructions,
  a branch predictor circuit to generate a predicted path for the branch instruction, and
  a branch re-steer circuit to, for the branch instruction dependent on a result from the load instruction, check if an instruction received by the pipeline circuit is the load instruction, and when the instruction received by the pipeline circuit is the load instruction, check for a write back of the result from the load instruction between a decode of the branch instruction with the decoder and an execution of the branch instruction with the execution circuit, and when the predicted path differs from a path based on the result from the load instruction, re-steer the branch instruction in the pipeline circuit to the path and cause execution of the branch instruction for the path based on the result from the load instruction.
Example 26. The system of example 25, wherein the branch re-steer circuit is to check for the write back of the result in a load value table that is separate from a final storage destination for the result.
Example 27. The system of example 26, wherein the branch re-steer circuit is to assign an index value for an entry in the load value table for the result of the load instruction when the instruction received by the pipeline circuit is the load instruction, and cause the index value to be sent into the pipeline circuit as a field of the branch instruction.
Example 28. The system of example 27, wherein the branch re-steer circuit is to update an entry for the branch instruction in a load dependent branch table with the index value when the instruction received by the pipeline circuit is the load instruction.
Example 29. The system of example 27, wherein the branch re-steer circuit is to assign the index value for a second branch instruction that is also dependent on the result from the load instruction.
Example 30. The system of example 25, wherein the re-steer of the branch instruction is to occur at an allocation stage of the pipeline circuit that assigns the execution circuit to execute the branch instruction.
Example 31. The system of example 30, wherein the re-steer of the branch instruction comprises a flush of data for the branch instruction for the predicted path from the pipeline circuit up to the allocation stage.
Example 32. The system of example 25, wherein the processor core further comprises circuitry, separate from an execution stage comprising the execution circuit of the pipeline circuit, to perform one or more operations to determine if the predicted path differs from the path based on the result from the load instruction.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include a conditional branch instruction. An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2018; and see Intel® Architecture Instruction Set Extensions Programming Reference, May 2018).

Exemplary Instruction Formats

Embodiments of the instruction(s) described herein may be embodied in different formats. Additionally, exemplary systems, architectures, and pipelines are detailed below.

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
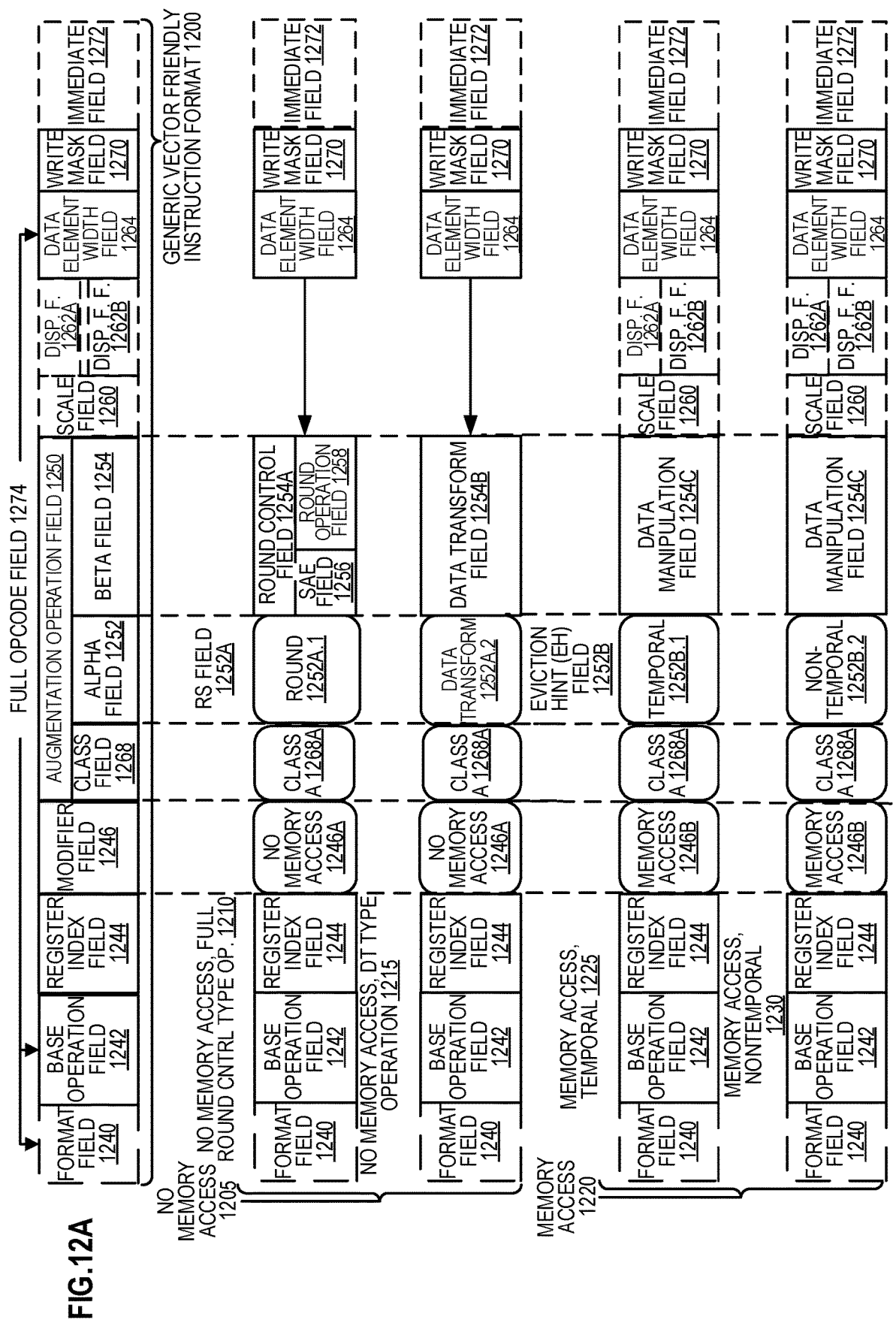
FIG. 12A is a block diagram illustrating a generic vector friendly instruction format and class A instruction templates thereof according to embodiments of the disclosure.
Figure 12B:
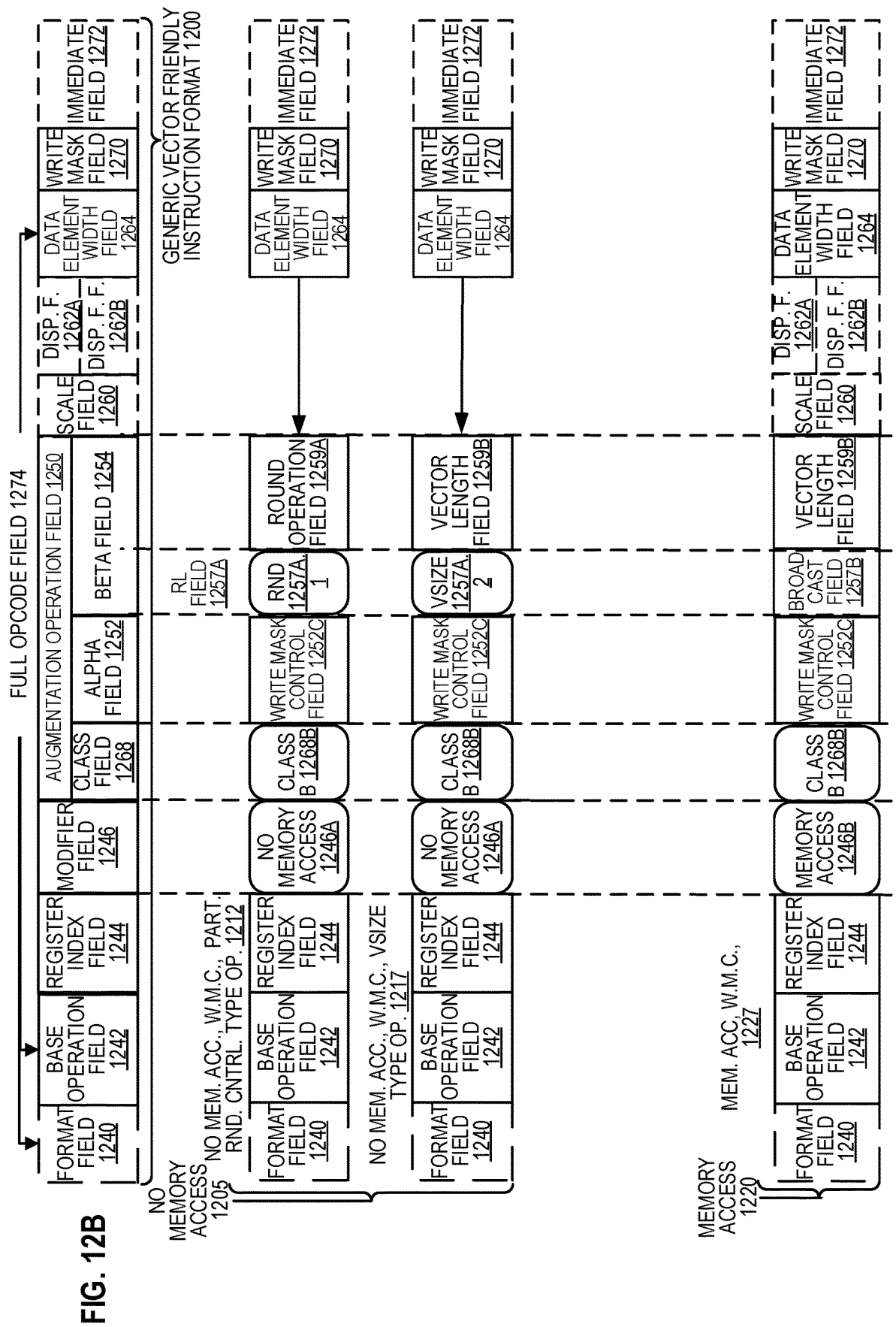
FIG. 12B is a block diagram illustrating the generic vector friendly instruction format and class B instruction templates thereof according to embodiments of the disclosure.

FIGS. 12A-12B are block diagrams illustrating a generic vector friendly instruction format and instruction templates thereof according to embodiments of the disclosure. FIG. 12A is a block diagram illustrating a generic vector friendly instruction format and class A instruction templates thereof according to embodiments of the disclosure; while FIG. 12B is a block diagram illustrating the generic vector friendly instruction format and class B instruction templates thereof according to embodiments of the disclosure. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the disclosure, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}$*index+base).

Displacement Field 1262A—its content is used as part of memory address generation (e.g., for address generation that uses $2^{scale}$*index+base+displacement).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the disclosure are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the disclosure the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the disclosure where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1212 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the disclosure where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one or more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13A is a block diagram illustrating an exemplary specific vector friendly instruction format according to embodiments of the disclosure. FIG. 13A shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 12A and 12B into which the fields from FIG. 13A map are illustrated.

It should be understood that, although embodiments of the disclosure are described with reference to the specific vector friendly instruction format 1300 in the context of the generic vector friendly instruction format 1200 for illustrative purposes, the disclosure is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the disclosure is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1305 (EVEX Byte 1, bits [7-5])—consists of an EVEX.R bit field (EVEX Byte 1, bit [7]-R), EVEX.X bit field (EVEX byte 1, bit [6]-X), and EVEX.B bit field (EVEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1310 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to one embodiment of the disclosure. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the disclosure. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
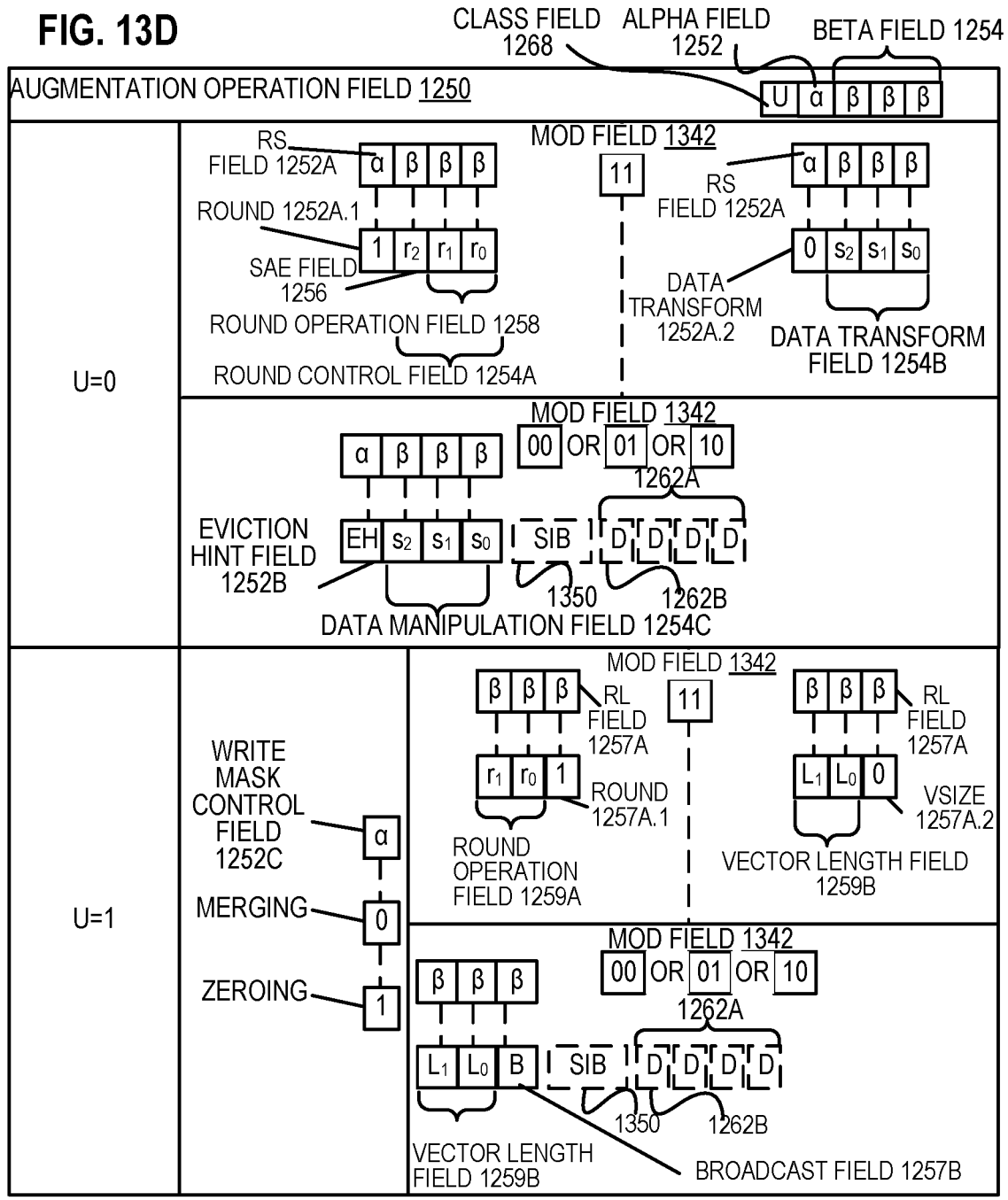
FIG. 13D is a block diagram illustrating the fields of the specific vector friendly instruction format in FIG. 13A that make up the augmentation operation field 1250 according to one embodiment of the disclosure.

FIG. 13D is a block diagram illustrating the fields of the specific vector friendly instruction format 1300 that make up the augmentation operation field 1250 according to one embodiment of the disclosure. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]-SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]-SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]-SSS) is interpreted as a three bit data manipulation field 1254C.

When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]-$S_0$) is interpreted as the RL field 1257A; when it contains a 1 (round 1257A.1) the rest of the beta field 1254 (EVEX byte 3, bit [6-5]-$S_{2-1}$) is interpreted as the round operation field 1259A, while when the RL field 1257A contains a 0 (VSIZE 1257.A2) the rest of the beta field 1254 (EVEX byte 3, bit [6-5]-$S_{2-1}$) is interpreted as the vector length field 1259B (EVEX byte 3, bit [6-5]-$L_{1-0}$). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-$L_{1-0}$) and the broadcast field 1257B (EVEX byte 3, bit [4]-B).

Exemplary Register Architecture

Figure 14:
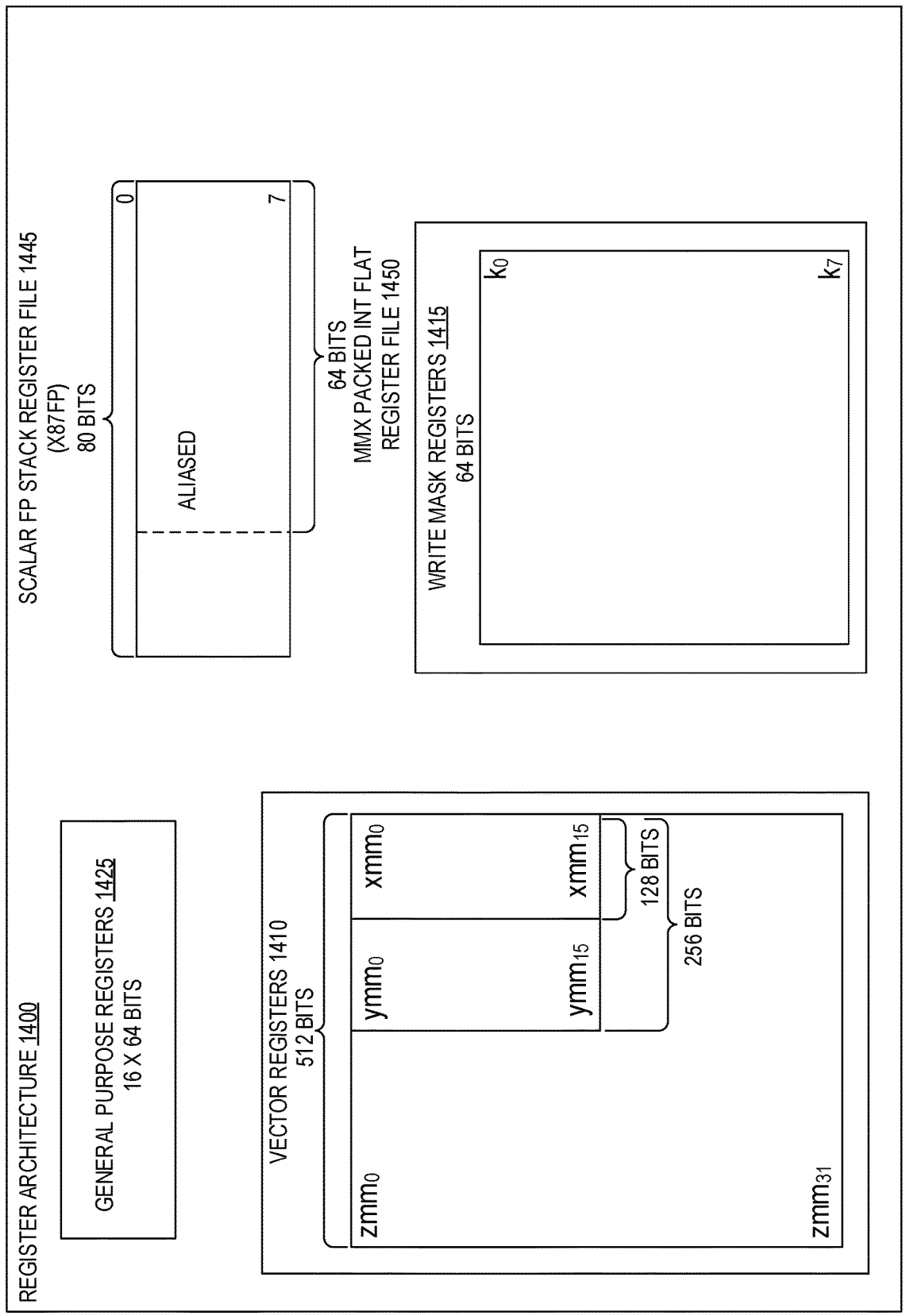
FIG. 14 is a block diagram of a register architecture according to one embodiment of the disclosure

FIG. 14 is a block diagram of a register architecture 1400 according to one embodiment of the disclosure. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
| --- | --- | --- | --- |
| Instruction Templates that do not include the vector length field 1259B | A (Figure 12A; U = 0) | 1210, 1215, 1225, 1230 | zmm registers (the vector length is 64 byte) |
| | B (Figure 12B; U = 1) | 1212 | zmm registers (the vector length is 64 byte) |
| Instruction templates that do include the vector length field 1259B | B (Figure 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to embodiments of the disclosure. FIG. 15B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macro-instructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 16B:
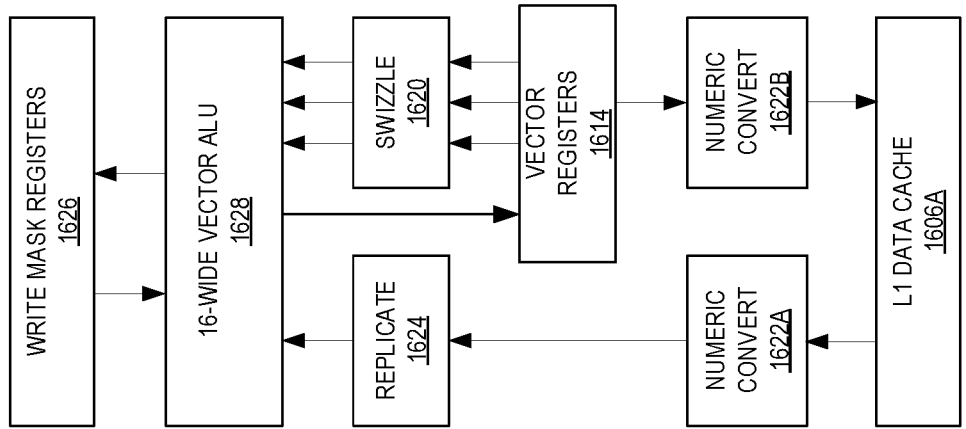
FIG. 16B is an expanded view of part of the processor core in FIG. 16A according to embodiments of the disclosure.
Figure 16A:
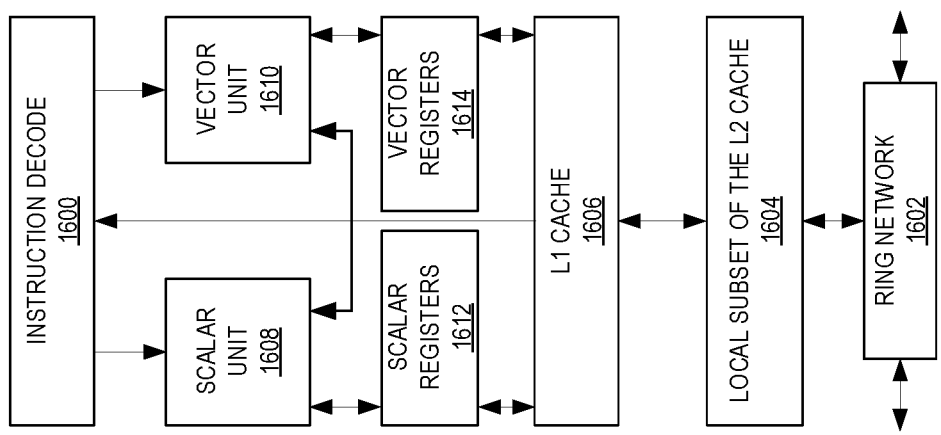
FIG. 16A is a block diagram of a single processor core, along with its connection to the on-die interconnect network and with its local subset of the Level 2 (L2) cache, according to embodiments of the disclosure.

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the disclosure. In one embodiment, an instruction decode unit 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the disclosure may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the disclosure. FIG. 16B includes an L1 data cache 1606A part of the L1 cache 1606, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
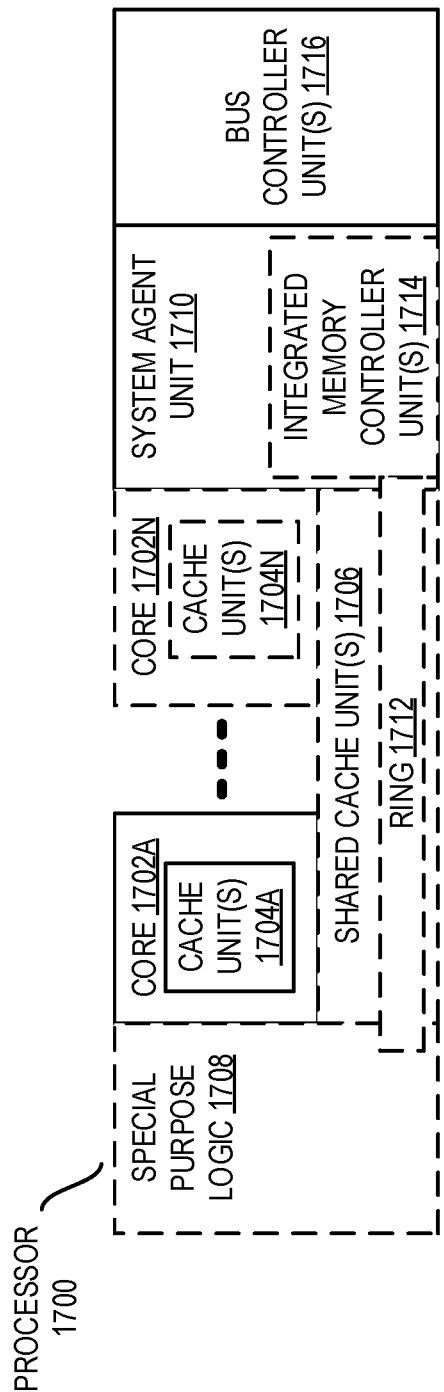
FIG. 17 is a block diagram of a processor that may have more than one core, may have an integrated memory controller, and may have integrated graphics according to embodiments of the disclosure.

FIG. 17 is a block diagram of a processor 1700 that may have more than one core, may have an integrated memory controller, and may have integrated graphics according to embodiments of the disclosure. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708, the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multithreading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
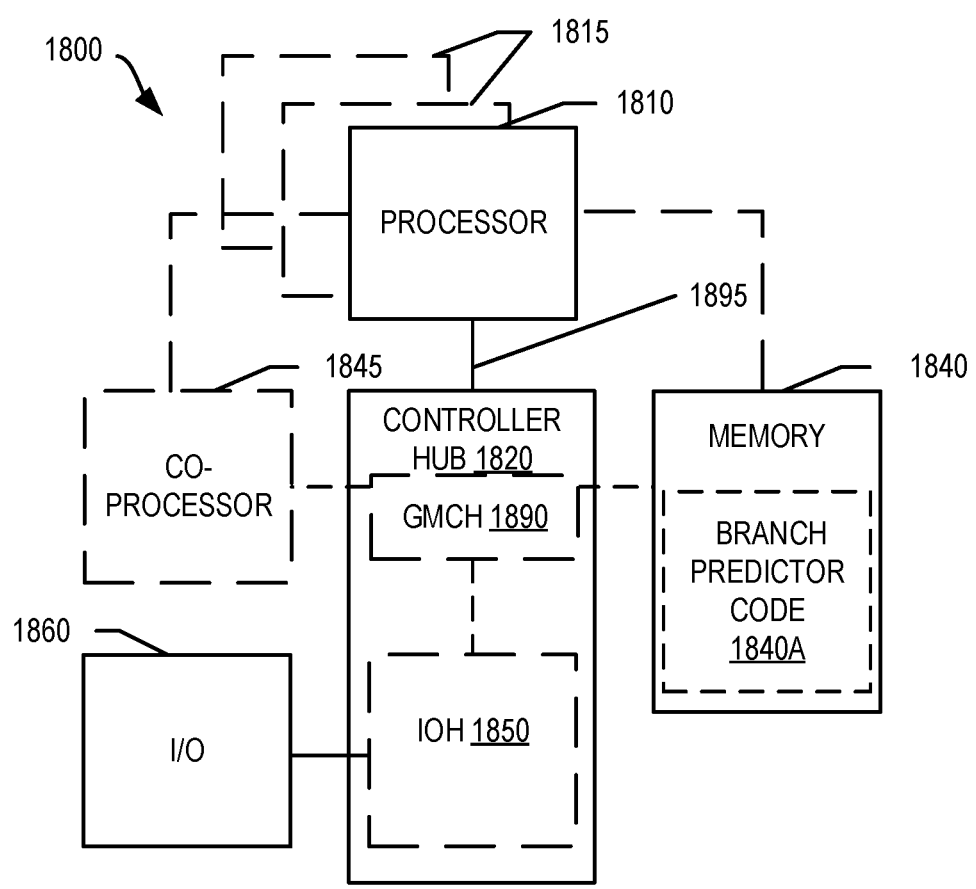
FIG. 18 is a block diagram of a system in accordance with one embodiment of the present disclosure.

Referring now to FIG. 18, shown is a block diagram of a system 1800 in accordance with one embodiment of the present disclosure. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850. Memory 1840 may include a branch predictor code 1840A, for example, to store code that when executed causes a processor to perform any method of this disclosure.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as Quickpath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
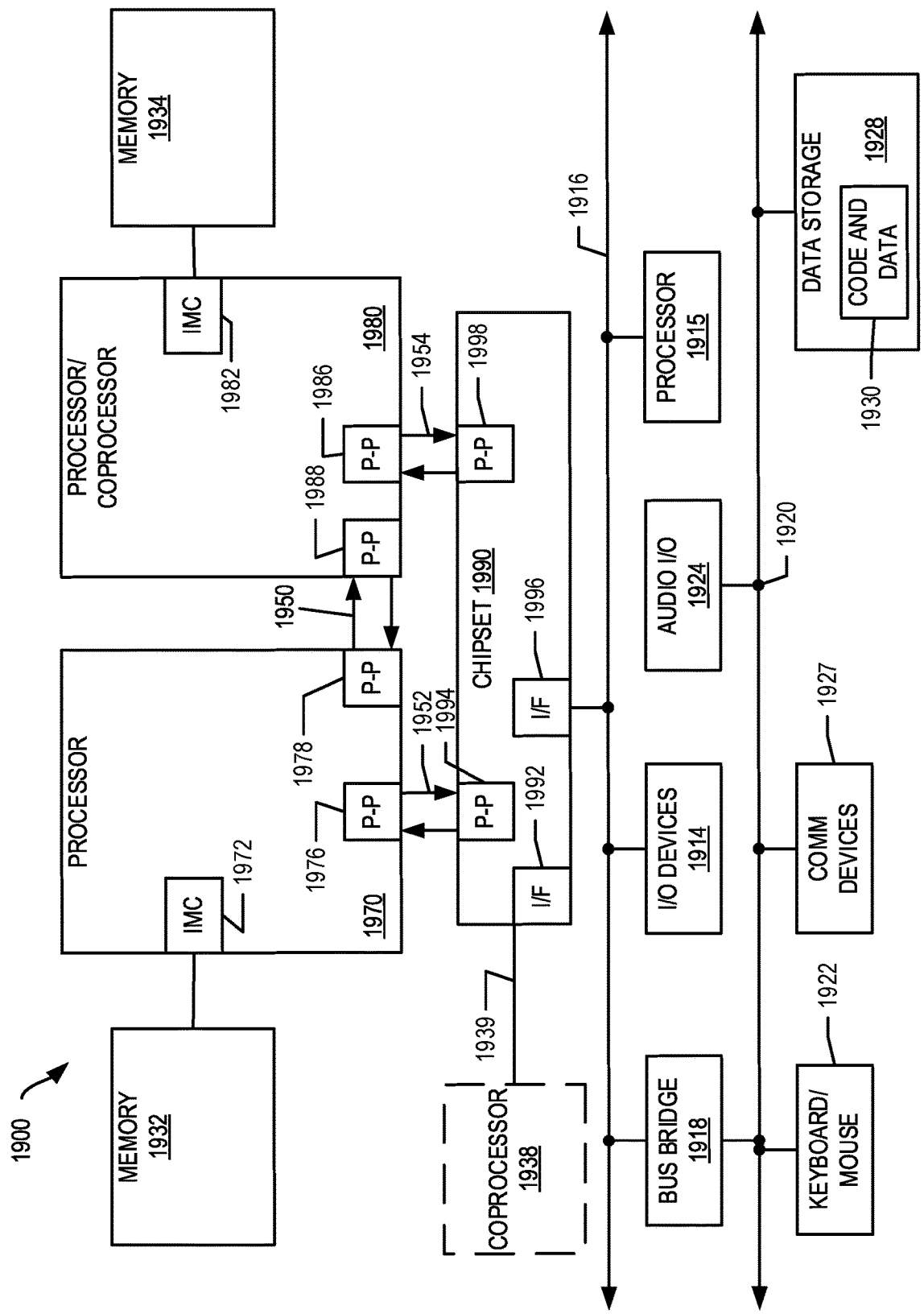
FIG. 19 is a block diagram of a more specific exemplary system in accordance with an embodiment of the present disclosure.

Referring now to FIG. 19, shown is a block diagram of a first more specific exemplary system 1900 in accordance with an embodiment of the present disclosure. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the disclosure, processors 1970 and 1980 are respectively processors 1810 and 1815, while coprocessor 1938 is coprocessor 1845. In another embodiment, processors 1970 and 1980 are respectively processor 1810 and coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present disclosure is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
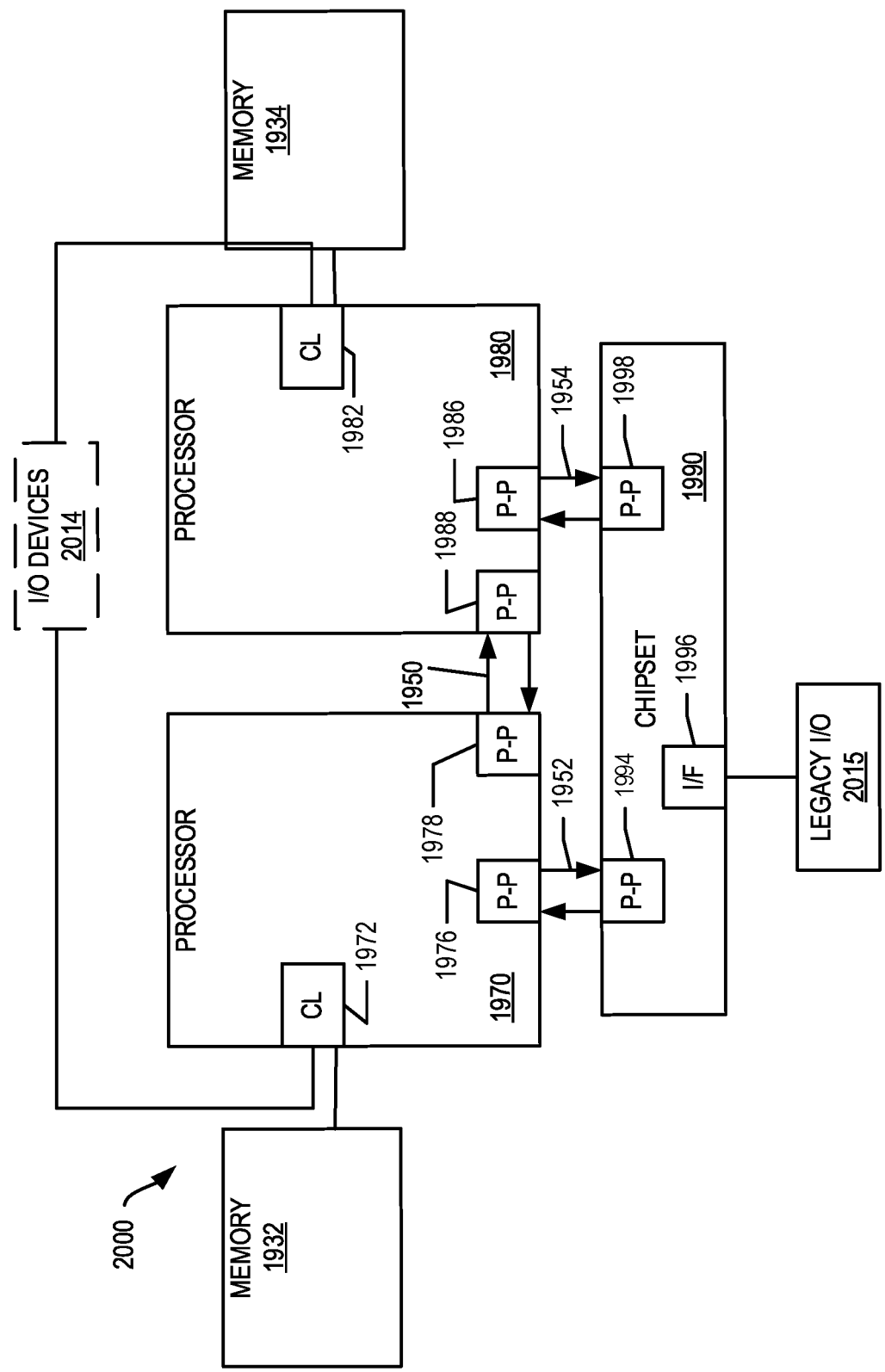
FIG. 20, shown is a block diagram of a second more specific exemplary system in accordance with an embodiment of the present disclosure.

Referring now to FIG. 20, shown is a block diagram of a second more specific exemplary system 2000 in accordance with an embodiment of the present disclosure. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
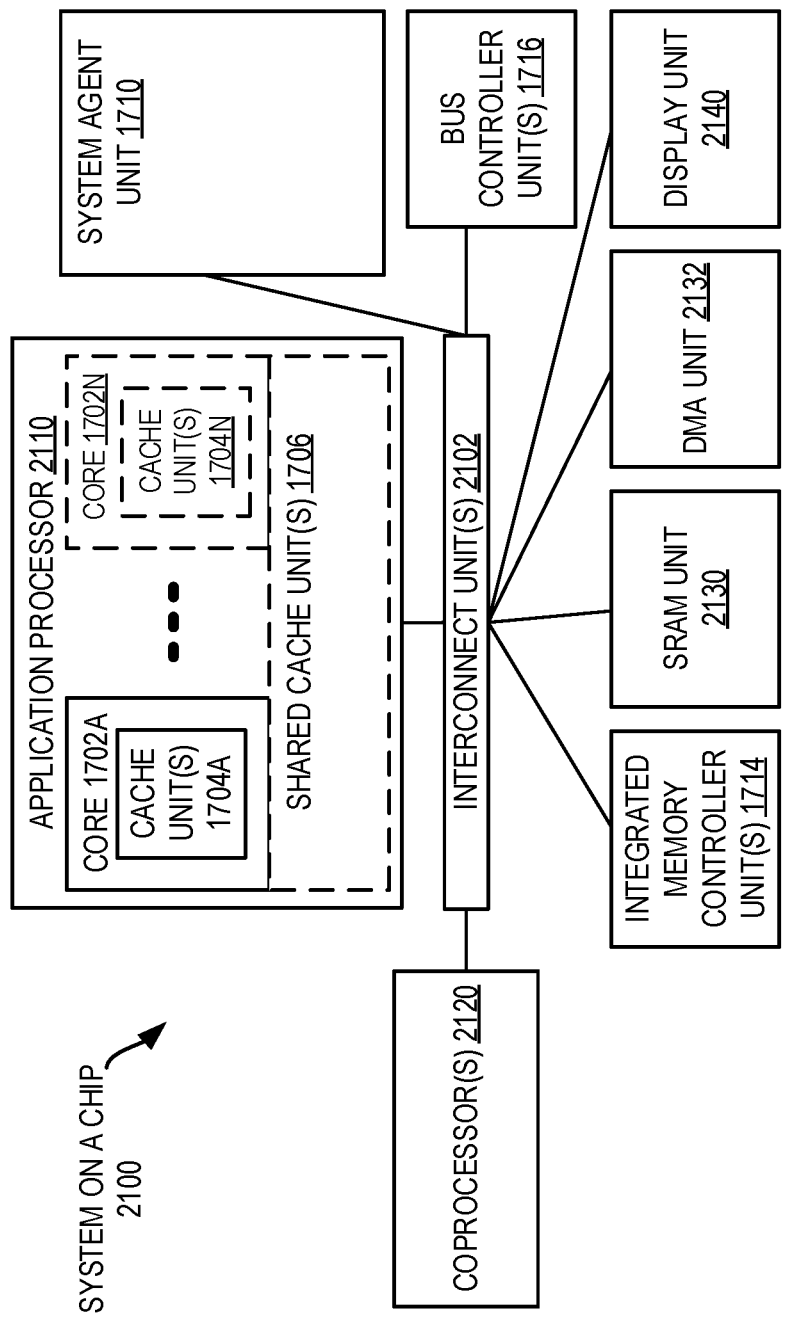
FIG. 21, shown is a block diagram of a system on a chip (SoC) in accordance with an embodiment of the present disclosure.

Referring now to FIG. 21, shown is a block diagram of a SoC 2100 in accordance with an embodiment of the present disclosure. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 22 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

What is claimed is:

1. A processor comprising:
a pipeline circuit comprising a decoder to decode instructions into decoded instructions and an execution circuit to execute the decoded instructions;
a branch predictor circuit to generate a predicted path for a branch instruction; and
a branch re-steer circuit to, for the branch instruction dependent on a result from a load instruction, check if an instruction received by the pipeline circuit is the load instruction, and when the instruction received by the pipeline circuit is the load instruction, check for a write back of the result from the load instruction between a decode of the branch instruction with the decoder and an execution of the branch instruction with the execution circuit, and when the predicted path differs from a path based on the result from the load instruction, re-steer the branch instruction in the pipeline circuit to the path based on the result from the load instruction and cause execution of the branch instruction for the path based on the result from the load instruction.

2. The processor of claim 1, wherein the branch re-steer circuit is to check for the write back of the result in a load value table that is separate from a final storage destination for the result.

3. The processor of claim 2, wherein the branch re-steer circuit is to assign an index value for an entry in the load value table for the result of the load instruction when the instruction received by the pipeline circuit is the load instruction, and cause the index value to be sent into the pipeline circuit as a field of the branch instruction.

4. The processor of claim 3, wherein the branch re-steer circuit is to update an entry for the branch instruction in a load dependent branch table with the index value when the instruction received by the pipeline circuit is the load instruction.

5. The processor of claim 3, wherein the branch re-steer circuit is to assign the index value for a second branch instruction that is also dependent on the result from the load instruction.

6. The processor of claim 1, wherein the re-steer of the branch instruction is to occur at an allocation stage of the pipeline circuit that assigns the execution circuit to execute the branch instruction.

7. The processor of claim 6, wherein the re-steer of the branch instruction comprises a flush of data for the branch instruction for the predicted path from the pipeline circuit up to the allocation stage.

8. The processor of claim 1, further comprising circuitry, separate from an execution stage comprising the execution circuit of the pipeline circuit, to perform one or more operations to determine if the predicted path differs from the path based on the result from the load instruction.

9. A method comprising:
generating a predicted path for a branch instruction with a branch predictor circuit of a processor;
checking, by a branch re-steer circuit of the processor for the branch instruction dependent on a result from a load instruction, if an instruction received by a pipeline circuit of the processor comprising a decoder to decode instructions into decoded instructions and an execution circuit to execute the decoded instructions, is the load instruction;
checking, by the branch re-steer circuit when the instruction received by the pipeline circuit is the load instruction, for a write back of the result from the load instruction between a decode of the branch instruction with the decoder and an execution of the branch instruction with the execution circuit;
re-steering the branch instruction in the pipeline circuit to a path based on the result from the load instruction by the branch re-steer circuit when the predicted path differs from the path based on the result from the load instruction; and
executing the branch instruction for the path based on the result from the load instruction by the execution circuit when the predicted path differs from the path based on the result from the load instruction.

10. The method of claim 9, wherein the checking for the write back comprises checking for the write back of the result in a load value table that is separate from a final storage destination for the result.

11. The method of claim 10, further comprising:
assigning, by the branch re-steer circuit, an index value for an entry in the load value table for the result of the load instruction when the instruction received by the pipeline circuit is the load instruction; and
causing the index value to be sent into the pipeline circuit as a field of the branch instruction.

12. The method of claim 11, further comprising updating, by the branch re-steer circuit, an entry for the branch instruction in a load dependent branch table with the index value when the instruction received by the pipeline circuit is the load instruction.

13. The method of claim 11, further comprising assigning, by the branch re-steer circuit, the index value for a second branch instruction that is also dependent on the result from the load instruction.

14. The method of claim 9, wherein the re-steering of the branch instruction occurs at an allocation stage of the pipeline circuit that assigns the execution circuit to execute the branch instruction.

15. The method of claim 14, wherein the re-steering of the branch instruction comprises a flush of data for the branch instruction for the predicted path from the pipeline circuit up to the allocation stage.

16. The method of claim 9, further comprising performing one or more operations to determine if the predicted path differs from the path based on the result from the load instruction with circuitry separate from an execution stage comprising the execution circuit of the pipeline circuit.

17. A system comprising:
a memory to store a branch instruction and a load instruction; and
a processor core, coupled to the memory, comprising:
a pipeline circuit comprising a decoder to decode instructions into decoded instructions and an execution circuit to execute the decoded instructions,
a branch predictor circuit to generate a predicted path for the branch instruction, and
a branch re-steer circuit to, for the branch instruction dependent on a result from the load instruction, check if an instruction received by the pipeline circuit is the load instruction, and when the instruction received by the pipeline circuit is the load instruction, check for a write back of the result from the load instruction between a decode of the branch instruction with the decoder and an execution of the branch instruction with the execution circuit, and when the predicted path differs from a path based on the result from the load instruction, re-steer the branch instruction in the pipeline circuit to the path based on the result from the load instruction and cause execution of the branch instruction for the path based on the result from the load instruction.

18. The system of claim 17, wherein the branch re-steer circuit is to check for the write back of the result in a load value table that is separate from a final storage destination for the result.

19. The system of claim 18, wherein the branch re-steer circuit is to assign an index value for an entry in the load value table for the result of the load instruction when the instruction received by the pipeline circuit is the load instruction, and cause the index value to be sent into the pipeline circuit as a field of the branch instruction.

20. The system of claim 19, wherein the branch re-steer circuit is to update an entry for the branch instruction in a load dependent branch table with the index value when the instruction received by the pipeline circuit is the load instruction.

21. The system of claim 19, wherein the branch re-steer circuit is to assign the index value for a second branch instruction that is also dependent on the result from the load instruction.

22. The system of claim 17, wherein the re-steer of the branch instruction is to occur at an allocation stage of the pipeline circuit that assigns the execution circuit to execute the branch instruction.

23. The system of claim 22, wherein the re-steer of the branch instruction comprises a flush of data for the branch instruction for the predicted path from the pipeline circuit up to the allocation stage.

24. The system of claim 17, wherein the processor core further comprises circuitry, separate from an execution stage comprising the execution circuit of the pipeline circuit, to perform one or more operations to determine if the predicted path differs from the path based on the result from the load instruction.

\* \* \* \* \*